United States Patent [19]

Minoura et al.

[11] Patent Number: 4,842,396
[45] Date of Patent: Jun. 27, 1989

[54] LIGHT MODULATION ELEMENT AND LIGHT MODULATION APPARATUS

[75] Inventors: Kazuo Minoura; Kazuhiko Matsuoka, both of Yokohama, Japan

[73] Assignee: Canon Kabushiki Kaisha, Tokyo, Japan

[21] Appl. No.: 748,835

[22] Filed: Jun. 26, 1985

[30] Foreign Application Priority Data

| Jun. 29, 1984 | [JP] | Japan | 59-135841 |
| Jun. 29, 1984 | [JP] | Japan | 59-135842 |
| Aug. 6, 1984 | [JP] | Japan | 59-164401 |
| Aug. 6, 1984 | [JP] | Japan | 59-164402 |
| Aug. 6, 1984 | [JP] | Japan | 59-164403 |
| Aug. 6, 1984 | [JP] | Japan | 59-164404 |

[51] Int. Cl.$^4$ .............................. G02B 26/10
[52] U.S. Cl. .................... 350/6.5; 350/360; 350/3.65; 358/233
[58] Field of Search ............ 350/6.5, 6.6, 6.91, 350/3.67, 3.65, 3.69, 3.7, 360, 361, 363, 378, 616, 618, 269, 96.27, 486, 487, 6.8, 162.15; 358/230, 233

[56] References Cited

U.S. PATENT DOCUMENTS

| 3,240,987 | 3/1966 | Hicks, Jr. .................... 350/96.27 |
| 3,547,510 | 12/1970 | De Bitetto ..................... 350/3.65 |
| 3,573,353 | 4/1971 | Henriques et al. .......... 350/162.15 |
| 3,746,911 | 7/1973 | Nathanson et al. ............. 358/233 |
| 3,797,910 | 3/1974 | Westwig ..................... 350/96.27 |
| 3,886,310 | 5/1975 | Guldberg et al. ............... 350/360 |
| 3,990,783 | 11/1976 | Kohashi ........................ 358/233 |
| 4,143,939 | 3/1979 | Desormiere et al. ............ 350/378 |
| 4,390,235 | 6/1983 | Minoura ........................ 350/6.6 |
| 4,408,826 | 10/1983 | Ike ............................... 350/6.8 |

Primary Examiner—Rodney B. Bovernick
Assistant Examiner—Loha Ben
Attorney, Agent, or Firm—Fitzpatrick, Cella, Harper & Scinto

[57] ABSTRACT

A light modulation element of the invention has a plurality of polygonal modulation portions for modulating incident light staggered on arrays. Sides, of each two adjacent portions on different arrays, which are closest to each other are parallel to each other and are not perpendicular to the array direction. The modulation portions can be arranged at a high density along the array direction, the utilization efficiency of illumination light is improved, and the modulation light amount can be increased. When an element is used for a recording apparatus, the S/N ratio is improved, uniform exposure along the array direction is achieved, and the required memory capacity is decreased. A light modulation apparatus of the invention has an imaging optical system, a modulation optical system, and a scanning optical system. By incorporating a suitable means in an optical system or changing the optical system arrangement, a separation angle between modulated and non-modulated lights is increased, and diffracted light generated due to a shape of a light modulation element as a component of the apparatus can be eliminated.

29 Claims, 21 Drawing Sheets

LIGHT MODULATION ELEMENT AND LIGHT MODULATION APPARATUS

BACKGROUND OF THE INVENTION

1. Field of the Invention

The present invention relates to a light modulation element and a light modulation apparatus having such an element and, more particularly, to a light modulation element for modulating light in accordance with an input signal and for use in a printer or a display, and a light modulation apparatus using such an element.

2. Description of the Prior Art

Light modulation elements of the type described above include a cantilever element utilizing electrostatic attraction force as described in "The Mirror-Matrix Tube: Novel Light Valve for Projection Displays: (IEEE TRANS. ELECTRON DEVICES, Vol, ED-22, No. 9, 1975), "Micromechanical light modulator array fabricated on silicon" (Appl. Phys. Lett., Vol. 31, No. 8 1977), or Japanese Laid-open Patent Application No. 17525/1984 of the same applicant as that of the present invention; a light modulation element utilizing the thermo-optical effect as described in Japanese Patent Application Laid-open No. 68723/1984; and a light modulation element or liquid crystal element utilizing a crystal having an electro-optical effect as described in Japanese Patent Application Laid-open No. 5526/1981.

FIG. 1 shows an example of an arrangement of an arrayed modulation element using a plurality of cantilever mirrors. Referring to FIG. 1, modulation portions 1a, 1b, 1c and 1d are reflection surfaces which are separated from each other by cut portions 3a, 3b, 3c and 3d leaving connecting portions 2a, 2b, 2c and 2d. The deflecting directions of the reflecting surfaces of the modulation portions 1a, 1b, 1c and 1d about the connecting portions 2a, 2b, 2c and 2d can be independently controlled by input signals, and can thus deflect light incident on the example.

FIG. 2 shows an example of a light apparatus using such a light modulation element 5. Light from an illumination system 6 illuminates the element 5. When the modulation portions 1a, 1b and 1c are not in operation, the light reflected thereby forms a light source image 7 in an arbitrary space position. However, when the modulation portions 1a, 1b and 1c are in operation, light incident on the modulation portions 1a, 1b and 1c is reflected in a direction which is different from that in the case wherein the elements 1a, 1b and 1c are not in operation. An imaging system 8 is arranged near the light source image 7 such that the light source image 7 does not enter the entrance pupil. An observation surface 9 is at a conjugate position with the element 5 with respect to the imaging system 8. The light reflected by the elements 1a, 1b and 1c is projected by the imaging system 8 onto the observation surface 9 as spots 10a, 10b and 10c. The observation surface 9 is a photosensitive body in the case of a printer, and is a screen in the case of a display. However, since the cut portions 3b and 3c as non-modulation portions are between the respective modulation elements 1a, 1b and 1c, images 11b and 11c corresponding to these portions 3b and 3c are formed on the observation surface 9. When the light modulation apparatus as shown in FIG. 2 using such a light modulation element is used in an optical apparatus such as a printer, a uniform exposure distribution along the array direction of the modulation portions cannot be obtained due to the presence of the cut portions. This problem is not limited to the light modulation element as shown in FIG. 1, and the same problem recurs in other known light modulation elements of similar type. FIG. 3 shows a method normally adopted to resolve this problem.

A light modulation element shown in FIG. 3 has light modulation portions 21, 22, 23, 24 and 25, non-modulation portions 31, 32, 33, 34 and 35, and cut portions S1, S2, S3, S4 and S5. As shown in FIG. 3, the modulation portions are staggered such that the odd-numbered modulation portions 21, 23, 25, . . . are arranged on an array AA' and the even-numbered modulation portions 22, 24, . . . are arranged on an array BB'. Data signals corresponding to one line are divided into the odd- and even-numbered arrays separated by a predetermined time period and are controlled to be in a single array on the final observation surface.

However, the conventional method shown in FIG. 3 is still subject to the following problems. First, the ratio of the amount of light which is deflected to the total amount of illuminating light incident on the elements, i.e., the utilization effect is low. The utilization efficiency is at or less than 50% since the total area of the nonmodulation portions 31, 32, . . . , 35 is larger than that of the modulation portions 21, 22, . . . , 25. Second, if the shape of each modulation portion is assumed to be a square having one side x, a distance l between the arrays AA' and BB' must be larger than the side x. However, in order to allow processing of input signals supplied sequentially, a given line must be modulated by the array AA', and input signals supplied in a time interval up to modulation by the next array BB' must be temporarily stored in a buffer memory. The larger the distance l, the larger the number of buffer memories required for this purpose. In view of this, in order to reduce the load of the electrical system, it is preferable that the distance l be decreased to a minimum.

FIGS. 4A, 4B and 4C show other conventional examples of light modulation apparatus using small reflecting surfaces exemplified by the cantilever mirror. FIG. 4A is a sectional view of the small reflecting surfaces. FIG. 4B is a plan view of the small reflecting surfaces. FIG. 4C is a diagram showing a display system using such a light modulation element. Small reflecting surfaces 1a, 1b and 1c have square shapes each having a side of 50 μm. The reflecting surfaces 1a, 1b and 1c are arranged in an array as separated by air gaps 2 of several microns. Each small reflecting surface is divided by cut portions 7a and 7b into four reflecting portions which are formed integrally with each other through an intersecting portion 3. Silicon columns 2a, 2b and 2c support the respective small reflecting surfaces at the intersecting portions 3. The columns 2a, 2b and 2c are fixed on a substrate S. Regions 5a capable of storing charges are formed in the surface portions of the substrate S which oppose the small reflecting surfaces. The regions 5a are isolated by insulating layers 4. 7a and 7b represent cut portions of the small reflecting surface. When a charge is stored in the region 5a, the reflecting portions of the corresponding small reflecting surface 1 are deformed about the intersection 3 by the electrostatic attraction force. This deformation in the reflecting portion changes the reflecting direction of incident light, thereby deflecting the incident light in a direction. Static changes are selectively injected into or extracted from the respective portions 5a, so that the reflecting direction of light at each reflecting surface is controlled and the incident light is modulated thereby.

In an apparatus as shown in FIG. 4C using such a light modulation element, a lens 12 images light from a light source 11 onto a stopper 13 having a reflecting surface. An objective lens 14 has its focal point aligned on the surface of the stopper 13. The small reflecting surfaces 1a, 1b and 1c are arranged at the opposite focal point side of the objective lens 14. An imaging lens 15 and a screen 16 are arranged behind the stopper 13. Light from the light source 11 is collimated into parallel light by the objective lens 14 through the lens 12 and the stopper 13 and becomes incident on the small reflecting surfaces. If the small reflecting surfaces are not deformed, the light is returned to the light source through the incident light path in the reverse order. However, if the small reflecting surface 1b is deformed, the light is deflected, and the light is collimated into parallel light by the objective lens 14, thereafter the light is partially shielded by the stopper 13 but is mostly focused by the imaging lens 15 and reaches the screen 16. In this light modulation element, since incident light is diffracted in the gaps (2, 7a, and 7b) between the reflecting surfaces, the diffracted light generates noise light. The diffracted light is mostly reflected in two orthogonal directions in accordance with the shape of the gaps (2, 7a, and 7b). In this element, the diffracted light is removed by forming the shape of the stopper 13 at the spectrum plane into a cross shape. This optical system is a Schlieren optical system which is conventionally known. Since such a Schlieren optical system is subject to incidence of non-modulated light having a high energy density, countermeasures against heat and surface reflection must be taken. In addition, the size, position, rotation or the like of the stopper 13 must be controlled with high precision. When an array of a plurality of imaging elements is used, in order to obtain a compact optical system the illumination system and the Schlieren system are rendered complex in structure and require high precision of arrangement.

As in the light modulation element described above, light modulation elements for modulating incident light by changing its phase are also subject to the same problem of diffracted light depending upon the element structure. Such light elements are described, e.g., in Japanese Patent Application Laid-open No. 5525/1981 and No. 68723/1984.

FIG. 5 shows a conventional light modulation apparatus as an example of a transmission-type light modulation element. Light 17 incident on a dielectric crystal 19 is output as non-deflected light 18a. However, when a heater 20 is energized, the incident light 17 is converted into deflected light 18b by a refractive index distribution 20' formed in the crystal.

In such a light modulation element, the separation angle of modulated light and non-modulated light is as small as several degrees. Therefore, when this element is used for a light modulation apparatus by shielding the modulated or the non-modulated light, such light shielding must be performed at a position sufficiently separated from the light modulation element in order to provide a good S/N ratio. When a plurality of optical modulation elements as shown in FIGS. 1 to 5 are arranged in a one-dimensional array or a two-dimensional array, non-modulated light transmitted through or reflected by non-modulation regions between modulation regions must be sufficiently separated from modulated light.

SUMMARY OF THE INVENTION

It is an object of the present invention to provide a light modulation element which is free from the conventional drawbacks and which is compact and lightweight and has a high light utilization efficiency, and to provide a light modulation apparatus which can eliminate or largely separate diffracted light generated depending upon the element shape or element modulation scheme and noise light including non-modulated light from modulated light.

In order to achieve the above object of the present invention, in a light modulation element having a plurality of modulation portions for modulating incident light in accordance with an input signal, the modulation portions are arranged on arrays and staggered such that sides of each two adjacent modulation portions arranged on different arrays, which are closest to each other are parallel to each other and are not perpendicular to the arrays.

Since the light modulation element of the present invention has the above-mentioned arrangement, it can improve a light utilization efficiency of illumination light, reduce a required capacity of a memory, increase a modulated light amount, improve an S/N ratio, and allow arraying at a high density and uniform exposure along the array.

In order to increase a separation angle between modulated light and non-modulated light, the light modulation element according to the present invention has the following feature. A means for increasing the light separation angle between modulated and non-modulated light is arranged at the output side of a light modulation element which has a relatively small separation angle between modulated and non-modulated light. A specific means adopted for this purpose can be suitably selected in accordance with the shape and function of each light modulation element used therewith. For example, examples of such means include an optical system having a negative refracting power and consisting of a concave cylindrical lens or the like, and a volume hologram arranged under predetermined conditions.

In order to eliminate noise light such as diffracted light produced depending upon the shape of a light modulation element, the light modulation apparatus according to the present invention has the following feature. In consideration of the direction along which a diffracted light distribution caused depending upon the shape of a light modulation element, in particular, its small reflecting surfaces is minimum, an optical system is implemented so as to guide output light from the small reflecting surfaces, i.e., only modulated light, to a predetermined optical system or a deflector. Such a light modulation apparatus can constitute a scanning optical system, a modulation optical system and an imaging optical system having various functions, and can provide a device suitable for use in a printer or a display.

DETAILED DESCRIPTION OF THE PREFERRED EMBODIMENTS

Figure 6:
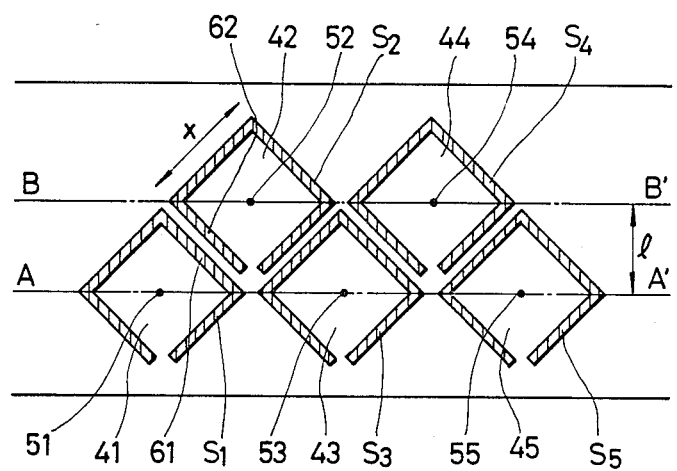
FIGS. 6 and 7 are views showing arrangements of light modulation elements according to the present invention.

FIG. 6 is a diagram showing a light modulation element according to an embodiment of the present invention. Of square modulation portions 41, 42, ..., 45 each having a side x, odd-numbered modulation portions 41, 43 and 45 are arranged on an array AA′, and even-numbered modulation portions 52 and 54 are arranged on an array BB′, such that their centers of gravity 51, 52, ..., 55 are shifted from each other, i.e., they are staggered. Sides 61 and 62, of each two adjacent modulation portions, in this case, the modulation portions 41 and 42 on different arrays, which are closest to each other are parallel to each other and are not perpendicular to the arrays AA′ and BB′. This arrangement results in the following advantages. First, the ratio of non-modulation portions to that of modulation portions is significantly reduced as compared to that of the conventional case shown in FIG. 3, and the utilization efficiency of illumination light is improved to a maximum of about 80%. In addition, the distance l between the arrays AA′ and BB′ can be shortened to 0.707x. The capacity of a memory section such as a buffer memory for storing time-serial input signals can be reduced.

Figure 2:
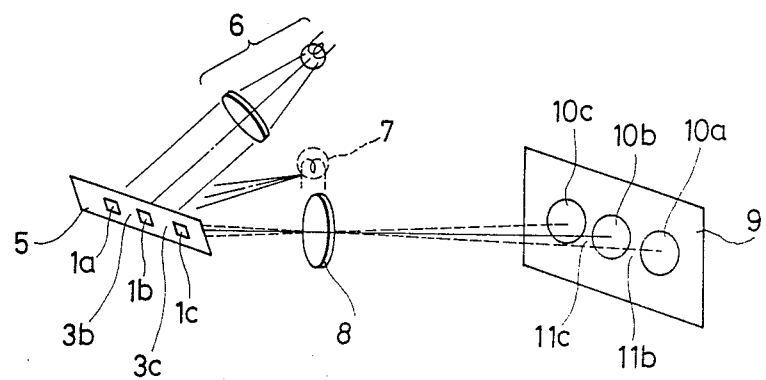
FIG. 2 is a view showing an example of a light modulation optical system using the conventional light modulation element.
Figure 3:
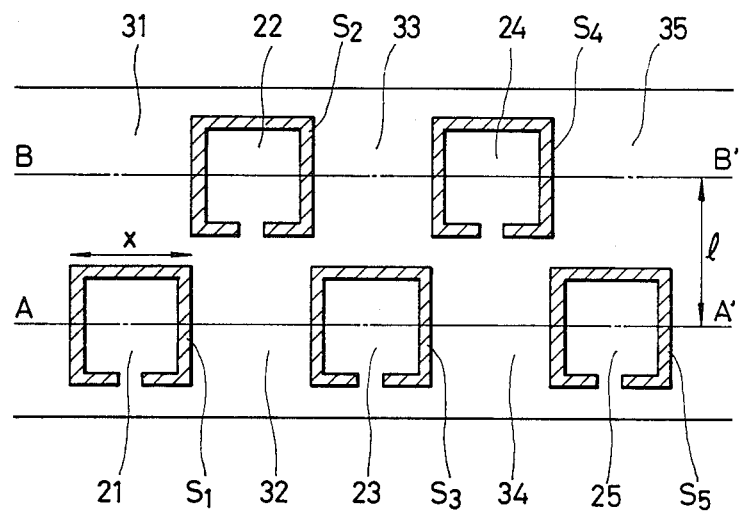
FIG. 3 is a diagram showing an example of a light modulation element having a staggered arrangement.

When the light modulation element as shown in FIG. 6 is arranged in an optical system as shown in FIG. 2, the distance l can be reduced as compared to the case wherein the light modulation element as shown in FIG. 3 is arranged. For this reason, the light modulation element can be arranged closer to the side of the light source 7. However, since the area of each modulation portion is identical in each case, the modulation portions of the light modulation element according to the present invention can be subjected to illumination light having a larger power density. As a result, at the observation surface 9, the signal light amount can be increased, and the S/N ratio can be improved. In addition, the pitch of the modulation portions in each array along the array direction can be reduced. As can be seen from the drawings, according to the embodiment of the present invention, the pitch of the adjacent modulation portions is 0.707x as projected onto the array AA′ or BB′. Therefore, when an identical imaging system is considered, a higher density can be obtained along the array direction than in the conventional case.

Second, an exposure distribution uniform along the array direction can be obtained. That is, in the light modulation element shown in FIG. 3, the amount of light modulated near the cut portions S1, S2, S3, ... is small. Therefore, the amount of light on the light-receiving surfaces at these portions along the array direction is smaller than that at remaining portions. This results in an exposure distribution non-uniform along the array direction. In contrast to this, in the light modulation element shown in FIG. 6, the staggered modulation portions can be arranged to partially overlap each other along the array direction. Therefore, even if the cut portions are present, the amount of light modulated at each point along the array direction becomes substantially constant. This is because the area of a modulator for directing light onto each single point along the array direction on the light-receiving surface can be rendered substantially equal. For this reason, the light amount distribution along the array direction of the light-receiving surface can be rendered uniform.

Figure 7:
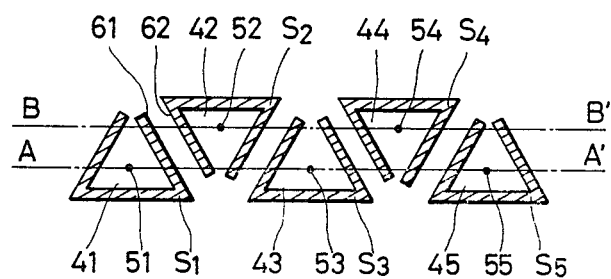

A light modulation element according to another embodiment of the present invention is shown in FIG. 7.

Figure 8:
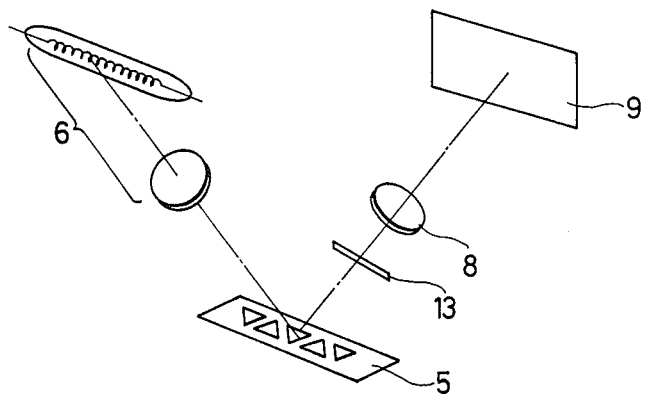
FIG. 8 is a diagram showing an optical system using a light modulation element according to an embodiment of the present invention.

Referring to FIG. 7, each modulation portion has a triangular shape. Odd-numbered modulation portions 41, 43 and 45 have their centers of gravity 51, 53 and 55 on a row AA', and even-numbered modulation portions 42 and 44 have their centers of gravity 42 and 54 o a row BB'. Since 61 and 62, of each two adjacent modulation portions of different arrays, in this case, portions 41 and 42, which are closest to each other are parallel to each other, and are not perpendicular to the rows AA' and BB'. FIG. 8 shows an example of an optical apparatus using such a light modulation element. Light from an illumination system 6 including a linear light source is reflected by a modulation element 5 as shown in FIG. 7, forms a light source image on a stopper 13, and is shielded. Light deflected by the modulation portions of the element 5 passes through the peripheral portion of the stopper 13 and is focused on an observation surface 9. This optical apparatus constitutes a Schlieren optical system.

Figure 9:
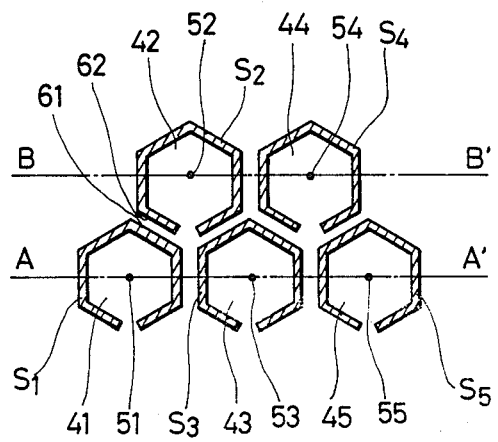
FIG. 9 is a view showing a light modulation element according to another embodiment of the present invention.

FIG. 9 shows a light modulation element according to still another embodiment of the present invention. In this embodiment, each modulation portion has a hexagonal shape. Odd-numbered modulation portions 41, 43 and 45 have their centers of gravity 51, 53 and 55 on a row AA', and even-numbered modulation portions 42 and 44 have their centers of gravity 52 and 54 on a row BB'. Sides 61 and 62, of each two adjacent modulation portions on different rows, in this case, the portions 41 and 42, which are closest to each other are parallel to each other and are not perpendicular to the row AA' or BB'. In the light modulation element shown in FIG. 7 or 9, as in the case of the light modulation element described with reference to FIG. 6, various advantages are obtained including an improved utilization efficiency of illumination light, a decrease in a memory capacity, an increase in the amount of signal (modulated) light, an improvement in the S/N ratio, a high modulation portion density along the array direction, and uniform exposure along the array direction.

The above embodiments have been described with reference to cases wherein light modulation elements are cantilevers. However, the present invention is not limited to this. For example, the present invention is similarly applicable to a light modulation element using the thermo-optical effect as described in Japanese Patent Application Laid-open No. 68723/1984. The light modulation element described in this Laid-open has the following arrangement. That is, a heater is arranged near a liquid layer. When the heater is energized, the liquid near the heater is provided with a refractive index distribution, thereby modulating incident light. In a light modulation element adopting this principle, if the shape and arrangement of the heater for the modulation portion is set in accordance with the principle of the present invention, a similar effect to that obtainable with the above embodiments of the present invention can be obtained.

Light modulation elements according to the present invention can include liquid crystal shutter arrays, light modulation elements utilizing the electro-optical effect, and light modulation elements utilizing the magneto-optical effect. The present invention is similarly applicable to a modulation light source array having a plurality of light sources capable of modulation, e.g., LED arrays, and in this case can also provide the same effect.

A light modulation element according to the present invention has the following effects in addition to a simple arrangement:

(1) Improved utilization efficiency of illumination light (2) Decreased memory capacity (3) Increased signal (modulated) light amount (4) Improved S/N ratio (5) High-density packing of modulation portions along the array direction (6) Uniform modulated light amount by modulation portions along the array direction For the reasons described above, a light modulation apparatus consisting of various optical systems including imaging optical systems, modulation optical systems, and scanning optical systems can be provided. When light modulation elements are arranged in a one- or two-dimensional array, they can be applied to a printer or a display. A light modulation element having small reflecting surfaces such as cantilevers described in the above embodiments has a wide selection of light sources, can be driven by a simple method, and can be arranged in an array. For these reasons, this type of modulation element can be applied in a wide variety of applications and allow proper shape and arrangement of small reflecting surfaces in accordance with a selected application.

A light modulation apparatus according to still another embodiment of the present invention will now be described in detail. Various elements such as those utilizing the electro-optical effect, the magnetooptical effect, the thermo-optical effect or the above-mentioned small reflecting surfaces can be used as light modulation elements for a light modulation apparatus according to the present invention. The following embodiment will be described mainly with reference to the case wherein a light modulation element utilizing small reflecting surfaces is used.

Figure 10:
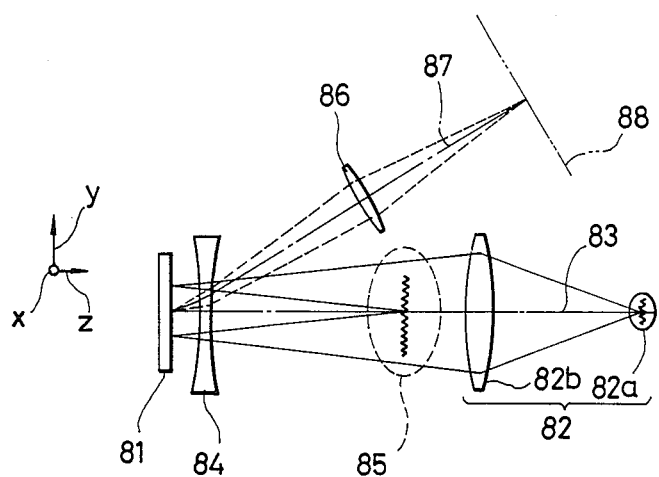
FIGS. 10 and 11 are views showing a light modulation apparatus according to still another embodiment of the present invention, in which the separation angle between modulated and non-modulated light is increased by an optical system having a negative refracting power.
Figure 11:
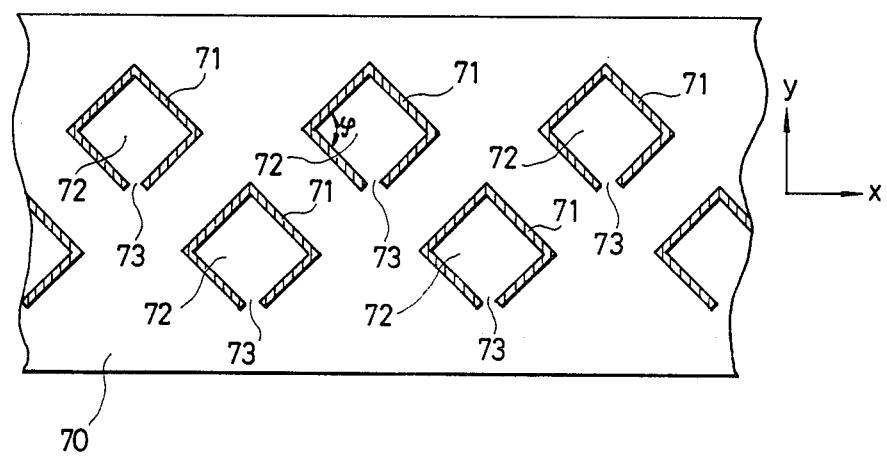

FIG. 10 shows a light modulation apparatus according to this embodiment, and FIG. 11 shows a light modulation element having small reflecting surfaces used in the apparatus shown in FIG. 10. The element shown in FIG. 11 is substantially the same as that shown in FIG. 6. Referring to FIG. 11, small reflecting surfaces 72 capable of changing shape upon application of an external force are formed in a light reflection surface 70 by grooves 71 inclined at an angle of 45° with respect to the x- and y-directions. The square small reflecting surfaces 72 are staggered and are linearly arranged in directions parallel to the x-direction. The surfaces 72 are defined by the grooves 71 and non-cut portions 73 which serve as fulcrums. As shown in FIG. 11, when an external force is applied to the small reflecting surfaces 72, the surfaces 72 deform about the fulcrums 73 in a direction perpendicular to the surface 70. Therefore, when light becomes incident on the surface 70 in a direction perpendicular thereto, the light is modulated by the deformed small reflecting surfaces 72 and is deflected in a plane which includes the y-axis and is perpendicular to the surface 70. In other words, light modulated by the light modulation element shown in FIG. 11 is deflected in a plane perpendicular to the array direction (x-direction) of the small reflecting surfaces 72. When light becomes incident on one surface of the light modulation element shown in FIG. 11, diffracted light is produced by the grooves 71. Most of this diffracted light is directed in a direction inclined at 45° with respect to the x- or y-direction. Therefore, the direction of light reflected by the small reflecting surfaces 72 coincides with a direction along which the amount of diffracted light is minimum.

The light modulation apparatus shown in FIG. 10 using this light modulation element will be described. Referring to FIG. 10, the array direction (x-axis) of the small reflecting surfaces is perpendicular to the surface 70. Therefore, light modulated by the small reflecting surfaces is deflected within a plane parallel to the surface 70. An illumination optical system 82 is formed by a light source 82a and a lens 82b for focusing light emitted therefrom. An optical axis 83 of the optical system 82 is perpendicular to the array direction (x-axis) of the small reflecting surfaces. A negative cylindrical lens 84 has a generating line parallel to the array direction (x-axis) of the small reflecting surfaces. Light incident on a light modulation element 81 from the illumination optical system 82 through the cylindrical lens 84 is reflected by a fixed light-receiving surface of the element 81 and non-modulating small reflecting surfaces 72, and forms an image of the light source 82a through the cylindrical lens 84. An imaging optical system 86 receives light which is modulated by the small reflecting surfaces and passed through the negative cylindrical lens 84. An optical axis 87 of the lens 86 is perpendicular to the array direction (x-axis) of the small reflecting surfaces. Therefore, the pupil of the imaging optical system 86 is parallel to the array direction of the small reflecting surfaces. A light-receiving surface 88 is arranged at a position to be focused by the imaging optical system, and comprises, e.g., a screen or a recording surface. The optical axis 87 of the imaging optical system 86 is arranged such that light on the axis from the illumination optical system 82 (light parallel to the optical axis 83) is parallel to light which is deflected by the small reflecting surfaces and passed through the negative cylindrical lens 84. As can be seen from FIG. 10, non-modulated light forms a light source image 85 on the optical axis of the illumination optical system 82. Meanwhile, since modulated light is scattered by the cylindrical lens 84, the separation angle of modulated light from non-modulated light is amplified. Therefore, modulated light is not affected by non-modulated light which is a noise light component. In the embodiment shown in FIG. 10, the optical axis of the cylindrical lens 84 is aligned with the optical axis 83 of the illumination optical system 82. However, the arrangement need not be so limited. A similar effect can be obtained if the optical axis of the cylindrical lens 84 is aligned with the reflecting direction of deflected light or at a position intermediate between the optical axis 83 of the illumination optical system 82 and the deflected light. Furthermore, in the light modulation element 81, a plurality of modulation portions of the light modulation element 81 can be arrayed in a direction perpendicular to the sheet of drawing.

Figure 12:
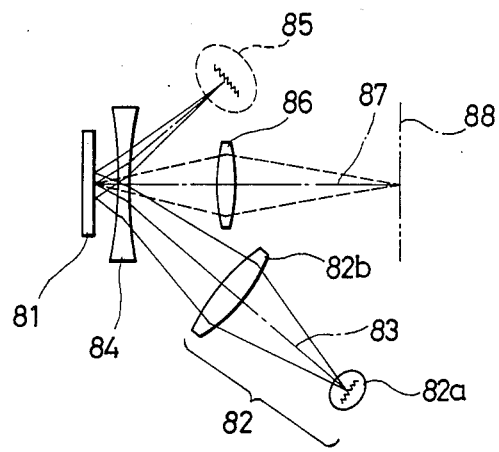
FIG. 12 is a diagram showing a light modulation apparatus according to still another embodiment of the present invention.

FIG. 12 shows a light modulation apparatus according to still another embodiment of the present invention. The same reference numerals as in FIG. 10 denote the same parts in FIG. 12, and a detailed description thereof will be omitted. The embodiment shown in FIG. 12 is different from that shown in FIG. 10 in that in this embodiment an optical axis 87 of an imaging optical system 86 is aligned with an optical axis of a cylindrical lens 84 and is perpendicular to the surface of a light modulation element 81. With this arrangement, light modulation portions having a function of deflecting illumination light in a plane parallel to the sheet of drawing, e.g., cantilever mirror type modulation portions, can be arranged in a two-dimensional matrix on the surface of the light modulation element 81. Modulated and non-modulated light can be separated by a sufficient separation angle as in the previous embodiment by means of the cylindrical lens.

Figure 1:
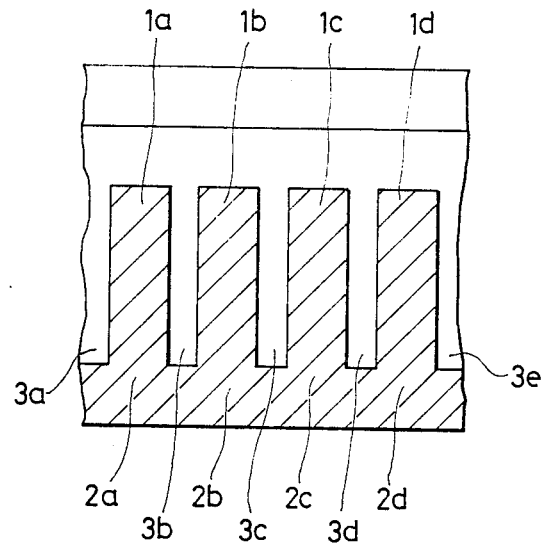
FIG. 1 is a schematic diagram showing an example of a conventional light modulation element.
Figure 13:
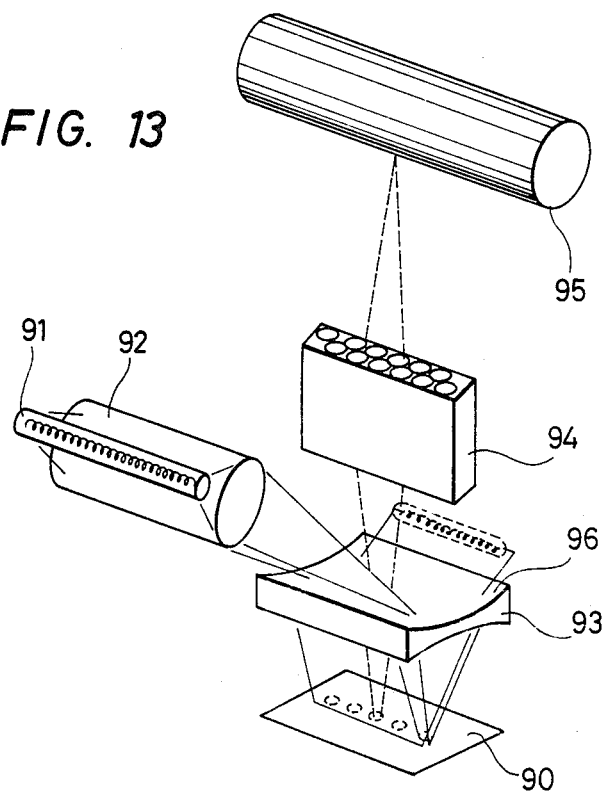
FIG. 13 is a diagram showing a light modulation apparatus according to still another embodiment of the present invention as used in a recording apparatus.

FIG. 13 shows a recording apparatus (printer) having the optical system of the light modulation apparatus as shown in FIG. 1 as a basic arrangement. Light from a linear light source 91 is passed through an illuminating cylindrical lens 92 and illuminates a light modulation element 90 consisting of a one-dimensional array of modulation portions. Deflected (modulated) light and non-deflected (non-modulated) light from the light modulation element 90 has a separation angle amplified by a negative cylindrical lens 93 which is arranged to have a generating line aligned with the array direction of the modulation portions. Deflected light is formed by a spot on a photosensitive drum 95 by a compound eye imaging system 94. Since non-modulated light is given a sufficient separation angle from the modulated light by the negative cylindrical lens 93, it does not become incident on the pupil of the compound eye imaging system 94. If an astigmatism generated on the photosensitive drum 95 due to deflected light passing through the negative cylindrical lens 93 presents a problem, the shape of each modulation portion of the modulation element 90, i.e., dimensions along the array direction and a direction perpendicular thereto can be appropriately controlled or a positive cylindrical lens can be arranged at a position to allow passage of only deflected light between the negative cylindrical lens 93 and the compound eye imaging system 94. Then, the astigmatism generated by the negative cylindrical lens can be corrected by an astigmatism generated by the positive cylindrical lens.

Figure 14:
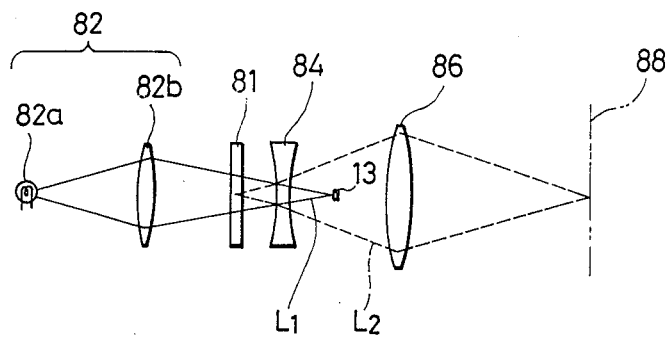
FIG. 14 is a diagram showing a light modulation element according to still another embodiment of the present invention.

FIG. 14 shows a light modulation apparatus according to still another embodiment of the present invention. In this embodiment, as in the case of Japanese Patent Disclosure No. 68723/1984, a light modulation element for converting the wave front of incident light utilizing the thermo-optical effect is used as a transmission type element and a Schlieren optical system is adopted. Since the modulation principle and arrangement of the light modulation element in this case are described in detail in the above-identified Disclosure, a description thereof will not be made herein. Referring to FIG. 14, light from a light source 82a illuminates a light modulation element 81 having a thermo-optical effect through an illumination lens system 82b. Non-modulated light (light not converted in its wave front) L1 is passed through a negative cylindrical lens 84, focused at a conjugate position of the light source 82a which is determined by the compound system of the illumination system 82b and the negative cylindrical lens 84, and is shielded by a stopper 13. Modulated light L2 incident on the active portion of the light modulation element 81 and converted thereby in its wave front is formed into scattered light. The scattering angle of the modulate light L2 is amplified, and the light L2 is focused on an observation surface 88 through the peripheral portion of the stopper 13 and an imaging lens system 86. In this embodiment, due to the presence of the negative cylindrical lens 84, a separation angle between the modulated and non-moduaited light is amplified. Therefore, the modulated light can be effectively guided onto the observation surface 88. Alignment precision of the Shlieren optical system can be improved significantly as in the previous embodiments.

As has been described with reference to the accompanying drawings, according to the present invention, the separation angle between modulated and non-modulated lights from the light modulation element can be amplified with a simple arrangement, so that the modulated light amount can be increased and the S/N ratio can be improved.

In the above embodiments, a negative cylindrical lens is used to amplify the separation angle between modulated and non-modulated lights. However, any type of lens having a negative refracting power can be used, and a lens system can be included for the purpose of abberation correction. An optical member utilizing a diffraction grating can also be used. An embodiment using a hologram lens as an example of such various types of lenses will be described below.

Figure 15A:
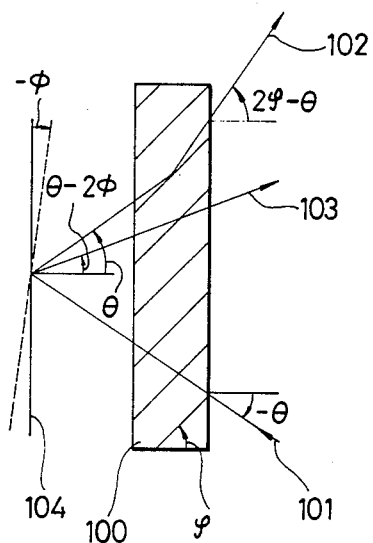
FIGS. 15A and 16 are a sectional view and a graph for explaining a volume hologram as an example of an optical element to be used in a light modulation apparatus according to the present invention.
Figure 16:
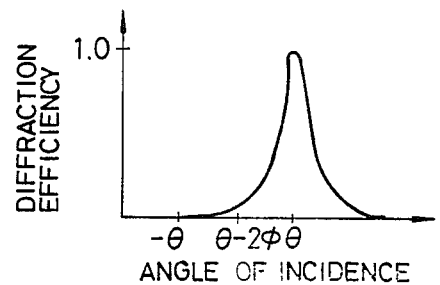

FIG. 15 shows a volume hologram as an example of an optical element for increasing the separation angle between modulated and non-modulated light used in a light modulation apparatus of this embodiment. Referring to FIG. 15, the interior of a volume hologram 100 can be assumed to be a phase grating having a predetermined inclination angle $\phi$ with respect to the tangent to the surface of the hologram. Incident light 101 having an inclination angle $\theta$ with respect to the tangent to the surface of the hologram is passed through the hologram 100 and reaches a mirror 104. As indicated by the solid line, if the surface of the mirror 104 is parallel to that of the hologram 100, the incident light 101 is reflected at an angle of $\theta$ with respect to the tangent to the hologram surface and becomes incident on the hologram 100 again. When the hologram (the angle $\phi$ or the like with respect to the angle of incidence $\theta$ to the hologram) is designed to satisfy the Bragg condition, the incident light 101 can be concentrated to diffracted light of a predetermined order, e.g., first-order diffracted light 102. At this time, the first-order diffracted light 102 forms angle of $2\phi - \theta$ with respect to the tangent to the surface of the hologram. This state is illustrated in FIG. 16. In FIG. 16, the angle of incidence is plotted against the axis of abscissa, and the diffraction efficiency is plotted along the axis of ordinate. A maximum diffraction efficiency is obtained at an angle of incidence $\theta$ which satisfies the Bragg condition. In the above description, when the incident light 101 is incident on the hologram with an angle of incidence of $-\theta$, the condition largely deviates from the Bragg condition, and most of the incident light passes straight through the hologram 100 as 0th-order light. Therefore, the light can be incident on the mirror 104 with substantially the same angle of incidence of $-\theta$.

A further description will be made with reference to FIG. 15. In the next stage, assume that the mirror 104 has been rotated through an angle $-\theta$ as indicated by the dotted line. Then, the incident light 101 is incident on the hologram 100 at an angle of incidence of $(\theta - 2\phi)$. However, as shown in FIG. 16, since the condition also largely deviates from the Bragg condition, most of the incident light is passed through the hologram as 0th-order light and becomes output light 103. As can be seen from the above description, before and after the rotation of the mirror 104, immediately after reflection by the mirror, the angle of reflected light is $2\phi$ while after passage through the hologram it is $2(\phi - \theta + \phi)$. Since $\phi > \theta$, an angle between the two light beams is amplified.

Figure 15B:
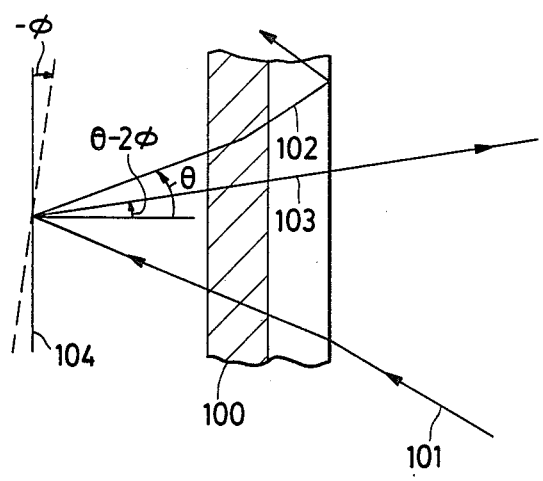
FIG. 15B is a sectional view showing a modification of FIG. 15A.

According to a modification, as illustrated in FIG. 15B a flat glass plate or the like can be adhered to the output side of the volume hologram so that only the first order diffracted light 102 is totally reflected at the boundary between the flat glass plate and the atmosphere. Then, the angle between the first-order diffracted light 102 and the light 103 can be amplified.

Figure 17:
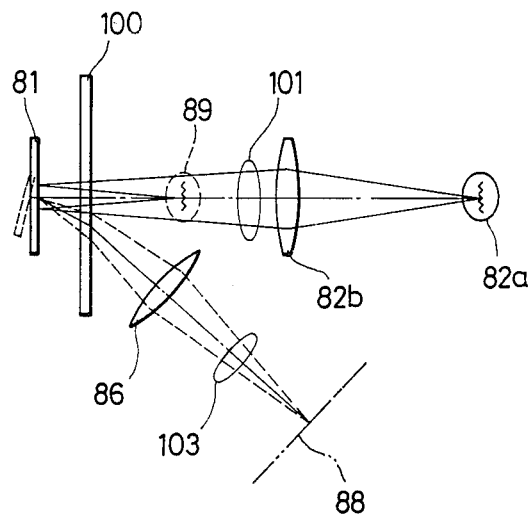
FIGS. 17, 18 and 19 are diagrams showing light modulation apparatuses according to still other embodiments of the present invention, in which the separation angle between modulated and non-modulated light is increased using the volume hologram.

FIG. 17 shows a light modulation apparatus having a hologram according to still another embodiment of the present invention. Referring to FIG. 17, a reflecting type deflection (modulation) element array is used. In this apparatus, a plurality of elements 81 as shown in FIG. 11 are arranged in a direction perpendicular to the sheet of drawing. Illumination light 101 from a light source 82a and an illumination system 82b becomes incident on the deflection element 81 in a direction perpendicular thereto. If the deflection element 81 is not in the deflection mode, the element 81 forms a light source image 89 along the optical axis of the illumination system. However, if the deflection element 81 is in the deflection (modulation) mode as indicated by the dotted line, the light is reflected by the deflection element 81 as deflected light 103 to the right lower side in FIG. 17. If a volume hologram 100 is arranged to satisfy the Bragg angle with respect to the angle of incidence on the hologram, the angle of the deflected light only with respect to the optical axis of the illumination system 82b can be amplified in accordance with the principle described with reference to FIGS. 15 and 16. As a result, the imaging system 86 can be arranged at a position sufficiently separated from the light of the illumination system, and only deflected light can be guided onto the observation surface 88 without interference from the illumination light (non-modulated light). In this embodiment, in order to prevent variations in the illumination light amount on the deflection element 81, the illumination system has an arrangement similar to the Köhler illumination. However, the present invention is not limited to this, and critical illumination can be adopted.

Figure 18:
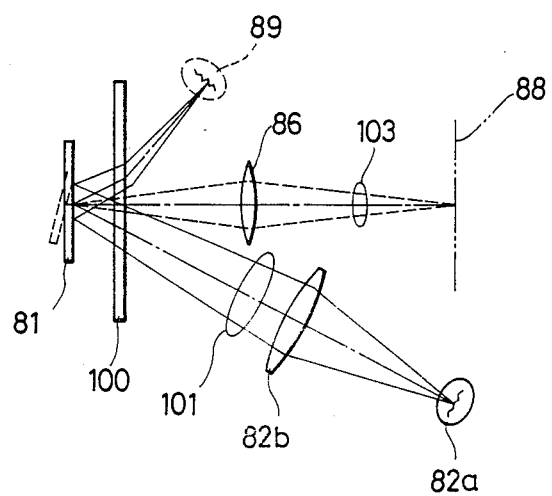

FIG. 18 shows a light modulation apparatus according to still another embodiment of the present invention. The apparatus of the embodiment shown in FIG. 18 has characteristic features wherein the optical axis of an imaging system 86 is perpendicular to the surface of a deflection (modulation) element 81. As a result, elements as shown in FIG. 11 can be arranged in a two-dimensional matrix on the surface of the deflection element 81. In this embodiment, illumination light 101 from a light source 82a illuminates the deflection element 81 by an illumination system 82b from the lower right side in FIG. 18. Non-deflected (non-modulated) light regularly reflected by the surface of the deflection element 81 becomes incident on a volume hologram 100 from the upper left direction in FIG. 18. When the volume hologram 100 is arranged to satisfy the Bragg angle with respect this angle of incidence in accordance with the principle described with reference to FIG. 16, an angle with respect to the optical axis of the imaging system 86 can be amplified. However, deflected (modulated) light indicated by the dotted line is not adversely affected by the volume hologram 100 but is focused on the observation surface 88 of the imaging system 86.

Figure 5:
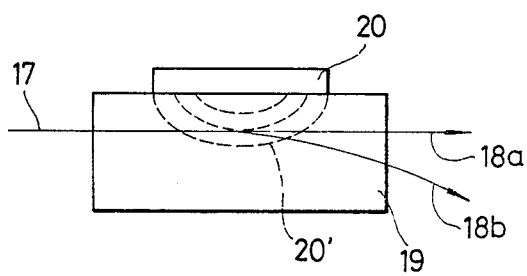
FIG. 5 is a view showing another example of a conventional light modulation element which utilizes the thermo-optical effect.
Figure 4A:
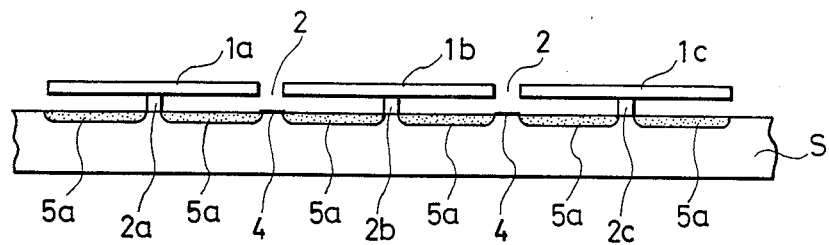
FIGS. 4A, 4B and 4C are views showing a light modulation element having an array of small reflecting surfaces and a light modulation system.
Figure 4B:
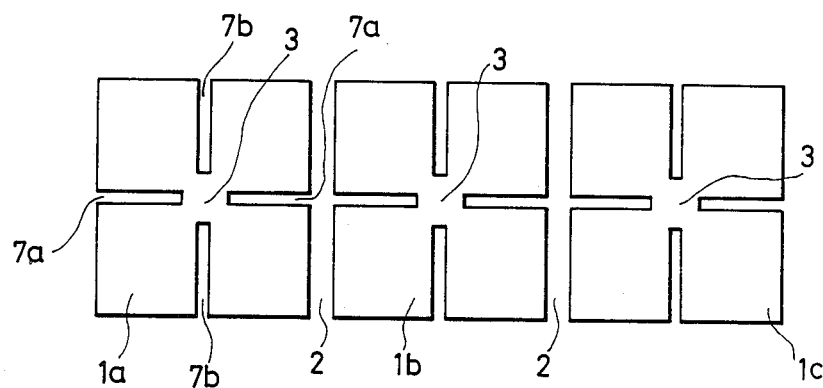
Figure 4C:
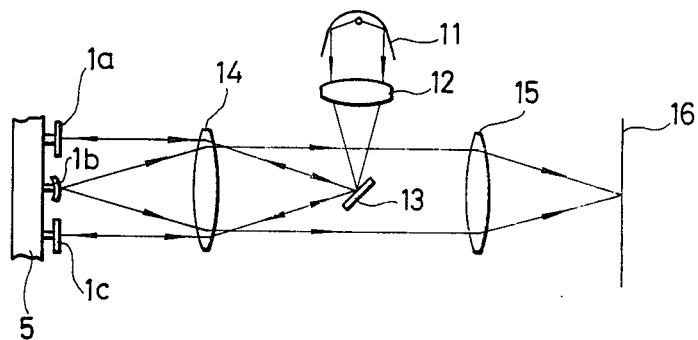
Figure 19:
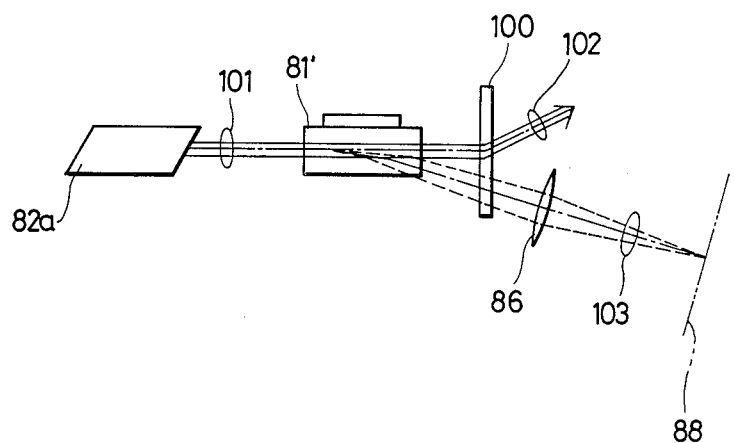

FIG. 19 shows a light modulation apparatus according to still another embodiment of the present invention. In this embodiment, a light modulation element utilizing the thermo-optical effect as shown in FIG. 5 is used as a light modulation element. When a light modulation element 81' is not in the deflection (modulation) mode, illumination light 101 from a laser light source 82a is passed straight through the light modulation element 81' and becomes incident on a volume hologram 100 as described above. When the hologram 100 satisfies the Bragg angle with respect to the angle of incidence, non-deflected (non-modulated) light 102 passes toward the upper right wide in FIG. 19. On the other hand, when the element 81' is in the operative state, deflected (modulated) light 103 indicated by the dotted line is passed straight through the volume hologram 100 and is focused on an observation surface 88 by an imaging system 86. In this embodiment, the light modulation element 81' can be a one-dimensinal light modulation element having a plurality of modulation regions in a direction perpendicular to the sheet of drawing. In this embodiment, the light source is not limited to the monochromatic light source.

In the light modulation apparatus according to the present invention, when a means for increasing the angle between modulated and non-modulated light is arranged at the output side of the light modulation element, a light modulation apparatus of simple arrangement and an improved S/N ratio can be obtained.

With the above method, modulated and non-modulated light can be separated satisfactorily. However, in a light modulation element using small reflecting surfaces, for example, diffracted light is generated due to the shape of the element, thus frequently causing noise light.

A light modulation apparatus to be described next is devised in order to resolve this problem. In this apparatus, an arrangement of the optical system is determined in accordance with a direction along which the diffraction light distribution in accordance with the element shape is minimum. The light modulation apparatus according to this embodiment capable of removing an adverse influence of diffracted light will be described.

Figure 20:
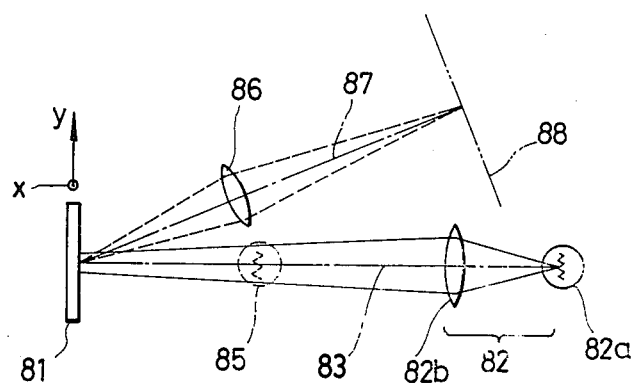
FIGS. 20 and 21 are diagrams for explaining a light modulation apparatus (modulation optical system) according to still another embodiment of the present invention, in which a pupil of the imaging optical system is parallel to the array direction of small reflecting surfaces.

FIG. 20 is a diagram showing a light modulation apparatus using the light modulation element as shown in FIG. 11 and capable of removing diffracted light. In a light modulation element 81 as shown in FIG. 11, the array direction (x-axis) of the small reflecting surfaces is deflected within a plane parallel to the sheet of drawing. An illumination system 82 consists of a light source 82a and a lens 82b for focusing light from the light source. An optical axis 84 of the system 82 is perpendicular to the array direction (x-axis) of the small reflecting surfaces. Light from the light source 82a is focused by the lens 82b, is regularly reflected by non-modulating small reflecting surfaces 72 and a fixed reflecting surface 70, and forms an image 85 of the light source 82a. An imaging optical system 86 receives light modulated and reflected by the small reflecting surfaces. An optical axis 87 of the imaging system 86 is perpendicular to the array (x-axis) of the small reflecting surfaces. The pupil of the imaging optical system 86 is parallel to the array direction of the small reflecting surfaces 72. A light-receiving surface 88 is arranged at a focal point of the imaging optical system 86 and a screen or a recording surface. The optical axis 87 of the imaging optical system 86 is arranged such that light on the axis of the illumination optical system 82 (light parallel to the optical axis 83) is parallel to the light deflected by the small reflecting surfaces. It is preferable that the pupil of the imaging optical system 86 spatially overlap the light source image 85 and that the distance between the pupil of the imaging optical system 86 and the light source image 85 be as small as possible, so that the light deflected by the small reflecting surfaces passes well through the pupil of the imaging optical system 86.

Figure 21:
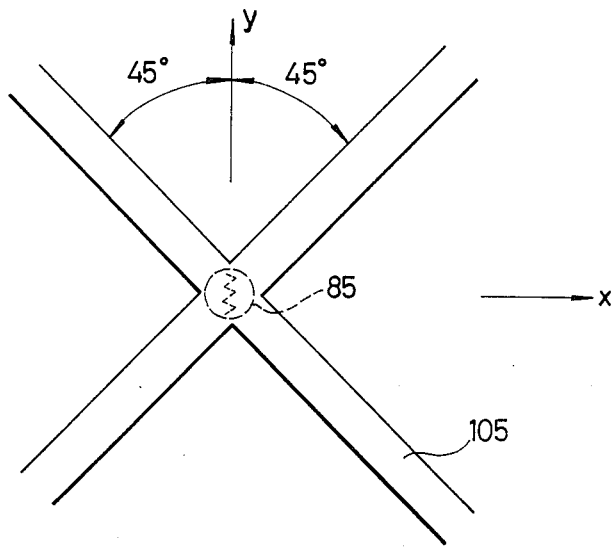

In the embodiment shown in FIG. 20, it is preferable that light reaching the light-receiving surface 88 be deflected by the small reflecting surfaces of the light modulation element. Therefore, diffracted light generated due to the array shape of the small reflecting surfaces must not enter the pupil of the imaging optical system 86. FIG. 21 illustrates the light amount distribution of diffracted light, as viewed from the optical axis 84 of the illumination optical system as shown in FIG. 20. In this diagram, a light source image 85 is as shown in FIG. 3, and a diffraction pattern 105 shows a peak light amount distribution of diffracted light. The x- and y-axis shown in FIG. 21 correspond to those shown in FIG. 20. Therefore, a plane including the y-axis shown in FIG. 21 and parallel to the sheet of drawing corresponds to a plane in FIG. 20 which includes the optical axis 84 of the illumination optical system 82 and the optical axis 87 of the imaging optical system 86. The imaging optical system 86 is arranged such that its pupil is aligned with the position (along the y-direction) at which a diffraction pattern 105 shown in FIG. 21 is minimum, and only the light deflected by the small reflecting surfaces along the y-direction is effectively received.

The arrangement of the optical system shown in FIG. 20 enables the efficient utilization of the modulated light (deflected light). In this manner, with an arrangement wherein the plane including the optical axes of the illumination optical system and the imaging optical system are perpendicular to the array direction of the small reflecting surfaces, the shape and array direction of the small reflecting surfaces can be set as shown in FIG. 11.

Figure 22:
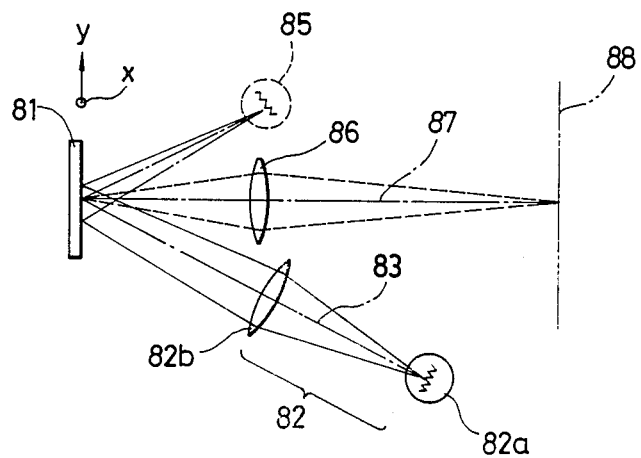
FIGS. 22 and 23 are diagrams showing a light modulation apparatus according to still another embodiment of the present invention.

FIG. 22 shows a light modulation apparatus according to still another embodiment of the present invention. The same reference numerals as in FIGS. 11 and 20 denote the same parts in FIG. 22, and a detailed description thereof will be omitted. The optical system shown in FIG. 22 is different from that shown in FIG. 20 in that in this embodiment an optical axis 87 of an imaging optical system 86 is perpendicular to the x-y plane, while in the optical system shown in FIG. 20 the optical axis 84 of the illumination optical system 82 is perpendicular to the x-y plane. As shown in FIG. 22, light from an illumination optical system 82 becomes obliquely incident on the x-y plane, is regularly reflected by the flat reflecting surface of the element 81, and forms a light source image 85. The optical axis 84 is perpendicular to the array direction (x-axis) of the small reflecting surfaces. The optical axis 87 of the imaging optical system 86 is perpendicular to the element surface (x-y plane) of a light modulation element 81. Therefore, the pupil of the imaging optical system 86 is parallel to the array direction of small reflecting surfaces 72. In this embodiment, the optical system is preferably set such that a light source image 85 is formed outside but near the pupil of the imaging optical system 86. In the embodiment shown in FIG. 22, the diffraction pattern generated near the light source image 85 is similar to that shown in FIG. 21. A plane including the y-axis and perpendicular to the sheet of drawing in FIG. 19 coincides with a plane including the optical axis 84 of the illumination optical system 82 and the optical axis 87 of the imaging optical system 86. Therefore, as in the case of the description made with reference to FIGS. 20 and 21, in this embodiment, the deflected light is deflected in a direction along which the diffraction pattern is minimum, thereby achieving a prescribed purpose. According to another characteristic feature of the present invention, small reflecting surfaces 72 of the light modulation element 81 are arranged in a two-dimensional matrix. Referring to FIGS. 20 and 22, if the small reflecting surfaces 72 are arranged in a multiple of arrays along the y-axis as well, in the case of FIG. 20, the surface (x-y plane) of the light modulation element 81 is not perpendicular to the optical axis of the imaging optical system 86. Therefore, if a region for allocating the small reflecting surfaces 72 along the y-axis is too small, it may fall outside the focal depth of the imaging optical system 86. However, in the embodiment shown in FIG. 22, since the optical axis 87 of the imaging optical system 86 is perpendicular to the surface (x-y plane) of the imaging optical system 86, this embodiment is similarly applicable to a light modulation element having a two-dimensional structure.

Figure 23:
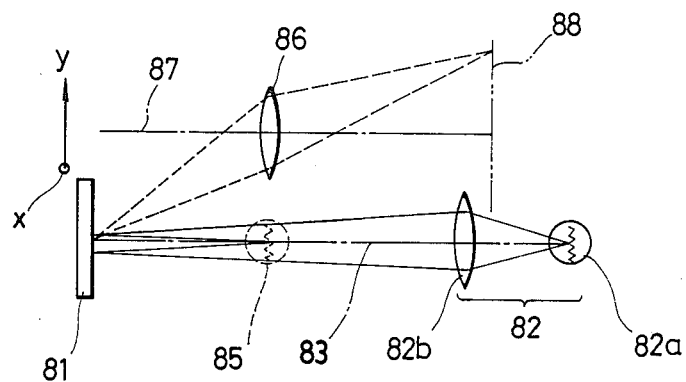

FIG. 23 shows a light modulation apparatus according to still another embodiment of the present invention. The same reference numerals in FIG. 23 denote the same parts as in FIGS. 11 and 20, and a detailed description thereof will be omitted. The relative positional relationship between an illumination optical system 82 and a light modulation element 81 is the same as in the embodiment shown in FIG. 20, and will not be described again. The characteristic feature of the arrangement of this embodiment resides in the arrangement of the imaging optical system 86. The pupil of the imaging optical system 86 is near a light source image 85, and an optical axis 87 is within a plane of the sheet of drawing and is perpendicular to the surface (x-y plane) of the light modulation element 81. In this embodiment, deflected light modulated by small reflecting surfaces causes out-of-axis imaging by the imaging optical system 86. However, in this embodiment as well, light is deflected in a direction along which the diffraction pattern is minimum. Since the optical axis of the imaging optical system 86 is perpendicular to the surface of the light modulation element 81, the embodiment is applicable to a light modulation element 81 of a two-dimensional matrix structure.

Figure 24:
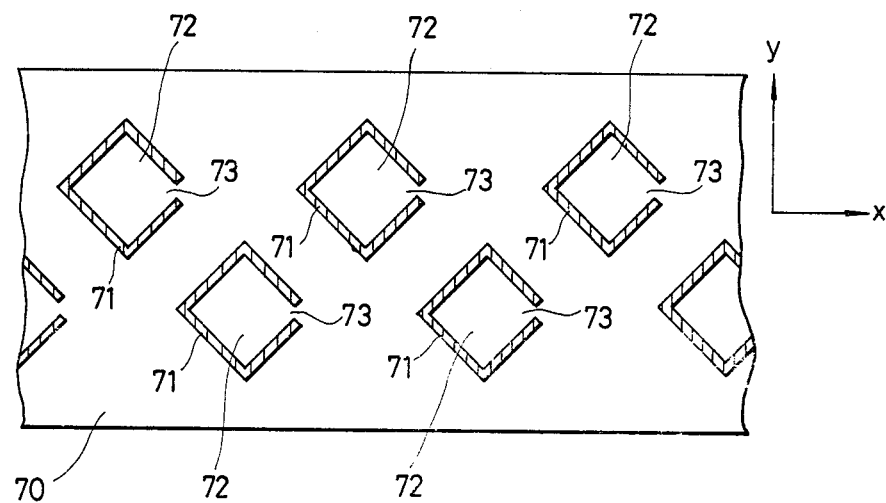
FIG. 24 is a view showing a light modulation element according to still another embodiment of the present invention and for use in a light modulation apparatus.

FIG. 24 shows a light modulation element according to still another embodiment of the present invention. FIG. 24 is a front view of the element. The element shown in FIG. 24 is substantially the same as that shown in FIG. 11, and the same reference numerals as in FIG. 11 denote the same parts in FIG. 24 and a detailed description thereof will be omitted. The light modulation element shown in FIG. 24 is different from that shown in FIG. 11 in that in the light modulation of this embodiment the direction of light deflected and reflected by the small reflecting surfaces is parallel to the array direction (x-direction) of the small reflecting surfaces. Therefore, when light perpendicular to the sheet of drawing becomes incident on the light modulation element, the light modulated thereby is deflected in a plane which is parallel to a plane which includes the x-axis and which is perpendicular to the sheet of drawing.

The light modulation element shown in FIG. 24 can be used in the optical system shown in FIGS. 22 and 23. In this case, the array direction of small reflecting surfaces 72 of a light modulation element 81 is aligned with the y-direction within the plane of the sheet of drawing. In this case, the pupil of an imaging optical system 86 is parallel to the array direction (y-direction) of the small reflecting surfaces. When the light modulation element shown in FIG. 24 is used in the optical system shown in FIG. 20, since the distance between the small reflecting surfaces and the pupil of the imaging optical system 86 is different, so-called local blur occurs. However, for a light modulation element having an array of small reflecting surfaces 72 within the focal depth of the imaging optical system 86, the optical system as shown in FIG. 20 can also be used.

In order to operate the small reflecting surfaces, an electric field can be used as in the conventional arrangement. In addition, a magnetic body can be coated as a light-reflecting film for forming a light reflecting surface 70, and small reflecting surfaces can be operated by a magnetic field.

The light modulation element can comprise a two-dimensional matrix of a plurality of pairs of staggered deflecting reflecting surfaces, as shown in FIG. 11 or 24.

As described above, according to a modulation optical system of the present invention, the following advantages are obtained.

(1) Diffracted light as noise light can be eliminated, and modulated light can be effectively utilized.

(2) The optical system can be simplified.

(3) The optical system can be rendered compact in size.

When non-modulated light other than the diffracted light is also to be eliminated, an optical system with a negative refracting power or a hologram element can be used to constitute a light modulation apparatus.

A description will now be made with reference to a light modulation apparatus having an optical system wherein illumination light is emitted from a plurality of light sources.

Figure 25:
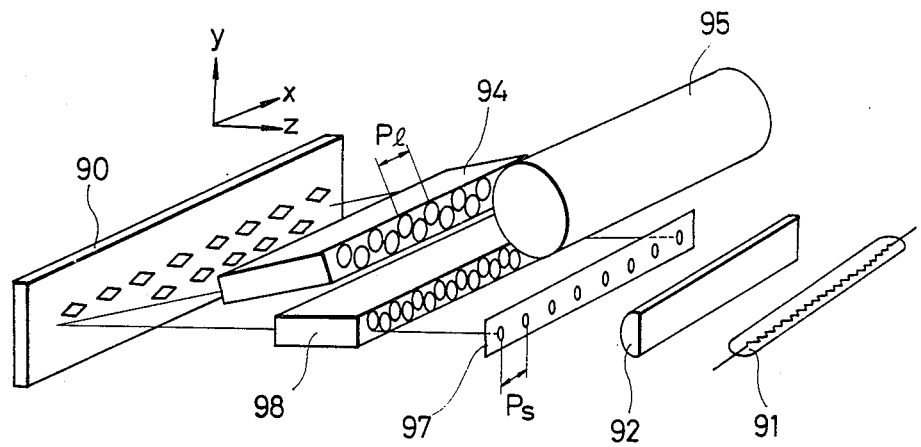
FIGS. 25 and 26 are diagrams showing light modulation apparatuses (modulation optical systems) according to still other embodiments of the present invention, in which the apparatuses have compound eye optical systems.
Figure 26:
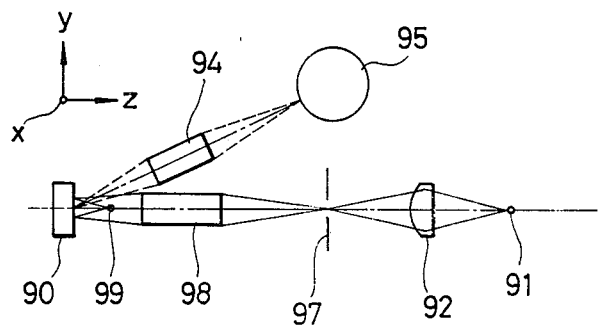

FIG. 25 is a perspective view of a light modulation apparatus using a light modulation element as shown in FIG. 11 and according to still another embodiment of the present invention. A light modulation element 90 has its element surface located within the x-y plane. Light incident on the element 90 is deflected and modulated in a plane which is parallel to a plane which includes the y-axis and is perpendicular to the element surface, i.e., in the y-z plane. A cylindrical lens 92 is arranged next to a linear light source 91 and has a power in the plane parallel to the y-z plane. Pinholes are formed in a pinhole plate at a pitch Ps. An erect equal-size illumination lens array 98 comprises a staggered array of focusing light guides (e.g., SELFOC) or a staggered array of rod lenses of uniform material. The optical axis of each lens element constituting the lens array is parallel to the z-axis. Therefore, the optical axis of each lens element constituting the lens array is perpendicular to the surface of the element 90. An imaging lens array 94 has the same arrangement as that of the lens array 98. The pupil of each lens element of the array 94 is parallel to the array direction (x-direction) of the small reflecting surfaces. The lens elements of each array are arrayed at a pitch Pl. The optical axis of each element of the array 94 forms a predetermined angle with respect to that of each element of the lens array 98. A photosensitive drum 95 is illustrated as one array of a light-receiving surface. FIG. 26 shows the schematic arrangement of the optical system shown in FIG. 25 viewed from the x-axis direction (array direction of the small reflecting surfaces). The imaging process will be described. Light from a rod-like light source 91 is focused onto a pinhole plate 97 by a cylindrical lens 92. Light passed through the pinholes of the pinhole plate 97 is output from a plurality of apparent point sources. The light is then focused by an illumination lens array 98, and becomes incident on a light modulation element 90. Light reflected by the fixed element reflecting surface and the non-modulating small reflecting surfaces is reflected by the element surface and forms a pinhole image 99. On the other hand, light modulated and deflected by the small reflecting surfaces is focused on the photosensitive drum 95 by the imaging lens array 94. The imaging lens array 94 is arranged such that the position of the incident pupil of each lens element is near the pinhole image 99 and diffracted light as noise light does not become incident on the pupil, as will be explained later.

Figure 27:
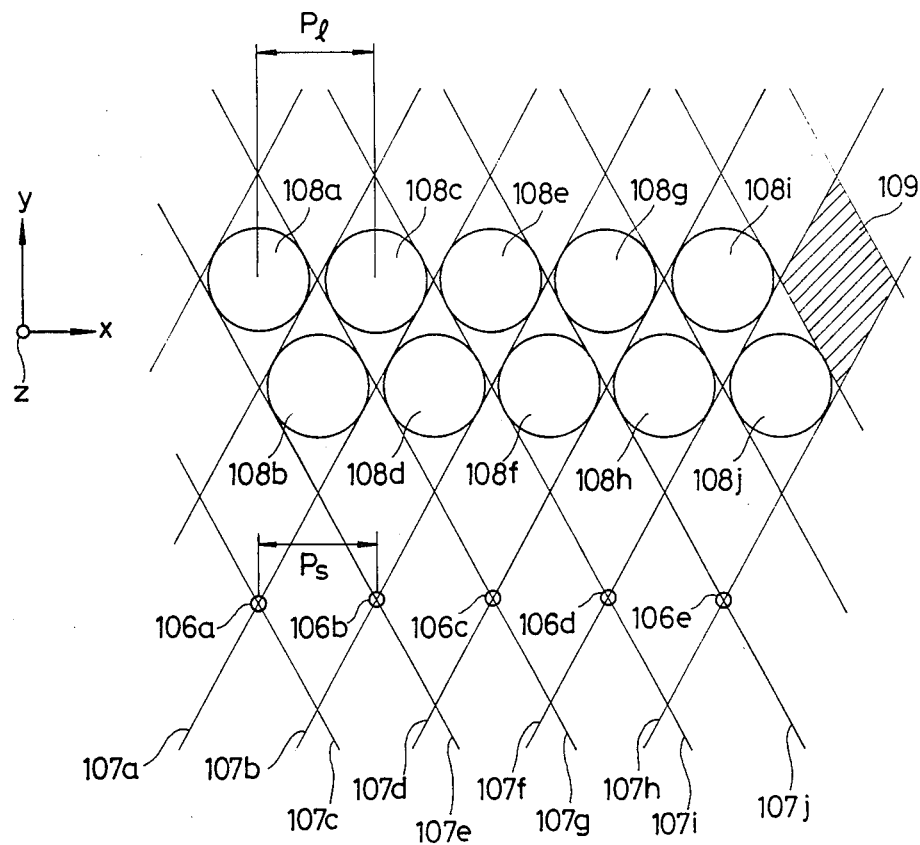
FIG. 27 is a diagram showing an arrangement of an imaging optical systems which takes into consideration noise light in a light modulation apparatus according to the present invention.

In order to prevent diffracted light generated due to the structure of the light modulation element from becoming incident on the imaging lens array, the lens element of the imaging lens array are arranged in a space excluding the space wherein the diffracted light amount generated in correspondence with each pinhole light source is large. This will be described with reference to FIG. 27. FIG. 27 shows the diffraction pattern formed by the light modulation element 90 when it is viewed in the z-direction in the optical system shown in FIG. 25, and the arrangement of each lens element of the imaging lens. Pinhole images 106a, 106b, . . . , 106e have intervals Ps as that of the pinholes since the illumination lens array 98 is an equal size optical system. Diffraction light generated by the grooves of the light modulation element as shown in FIG. 11 is strongest along directions 107a, 107b, 107c, . . . , 107j. Lens elements 108a, 108b, . . . , 108j constitute the imaging lens array 94. A parallelpiped region 109 surrounded by the diffraction light pattern representing a space of strongest diffracted light is a region of weakest diffracted light. The respective lens elements (108a, . . . , 108j) are staggered in the region 109. The size of each lens element is set to have a diameter which can be set within a space region 109. In the embodiment shown in FIG. 27, one lens element is arranged in the space region 109. However, the diameter of the lens element can be reduced so as to allow arrangement of a plurality of lens elements within the region 109. The lens elements arranged in an array need not be arranged densely within all regions 109 as shown in FIG. 27 but can be arranged in every other region 109. That is, the lens array arrangement is not particularly limited if the data from the modulation portions of the light modulation element 90 can be transmitted to the light-receiving surface with accuracy. In other words, when the lens pitch Pl of the lenses of the lens array and the pitch Ps of the pinhole images satisfy:

Pl:Ps=1:m or Pl:Ps=n:1 the respective lens elements can be arranged at positions which result in a small diffracted light distribution. Note that m and n are integers, and in the embodiment shown in FIG. 17, Pl:Ps=1:1.

In the embodiment shown in FIG. 25, the light source section can comprise a plurality of light-emitting diodes or semiconductor lasers arranged at predetermined intervals.

Figure 28:
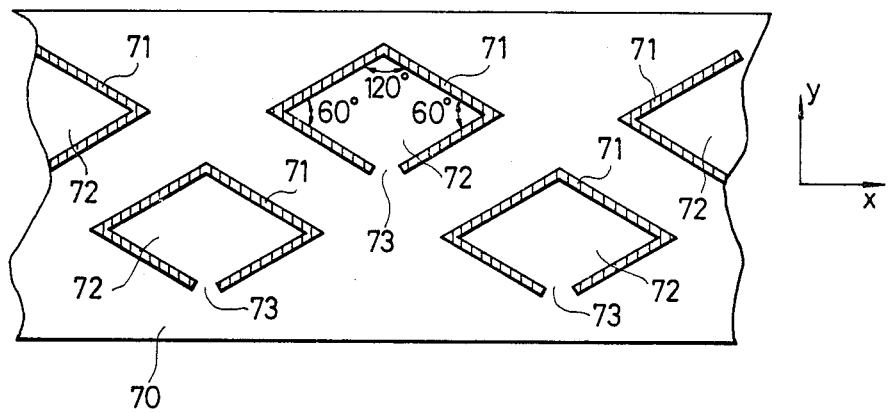
FIG. 28 is a light modulation element according to still another embodiment of the present invention and for use in a light modulation apparatus.
Figure 29:
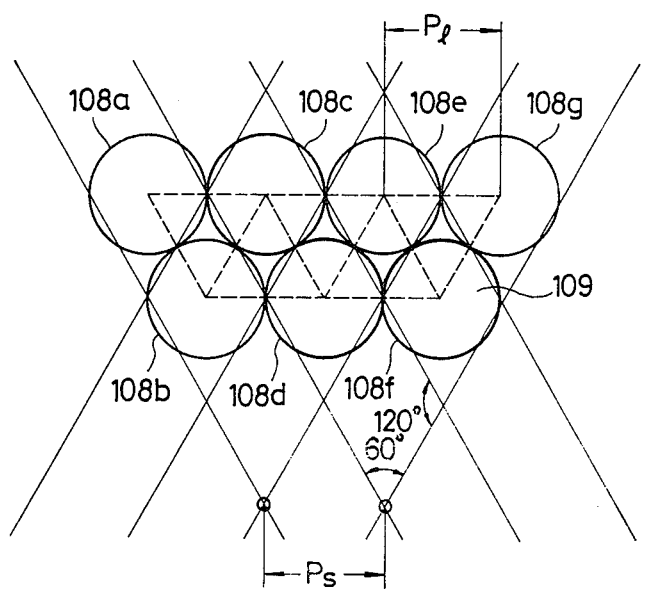
FIG. 29 is a diagram showing an arrangement of an imaging optical system which taken into consideration noise light in a light modulation apparatus using the element shown in FIG. 28.

FIG. 28 shows a light modulation apparatus which is suitable for a compound eye lens array having a staggered arrangement and frequently used today. A light modulation element shown in FIG. 28 is similar to that shown in FIG. 11, and each modulation portion comprises a parallelpiped having vertices of 60 and 120°. The same reference numerals as in FIGS. 11 and 27 denote the same parts in FIG. 28, and a detailed description thereof will be omitted. A compound eye lens array which is conventionally used has a stacked arrangement as shown in FIG. 29. Therefore, the figure connecting the centers of adjacent lens elements is a regular triangle as indicated by the dotted line in FIG. 29. A space region 109 of a diffraction pattern determined by the shape of small reflecting surfaces is a parallelpiped having vertices of 60° and 120°. The lens elements stacked in this manner can be arranged in the space region 109 having weakest diffracted light.

Figure 30:
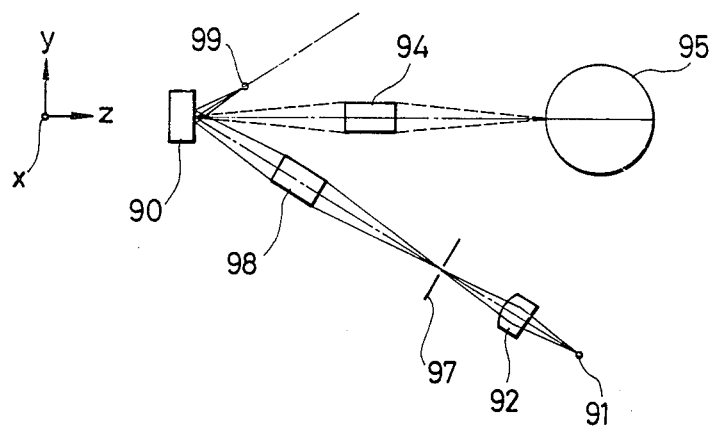
FIGS. 30 and 31 are diagrams showing light modulation apparatuses according to still other embodiments of the present invention.
Figure 31:
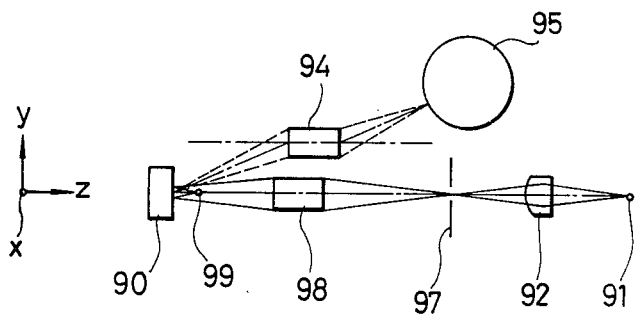

FIGS. 30 and 31 show light modulation apparatuses according to still other embodiments of the present invention. The same reference numerals as in FIGS. 25 and 26 denote the same parts in FIGS. 30 and 31, and a detailed description thereof will be omitted. In the optical system shown in FIGS. 30 and 31, the basic arrangement is the same as that shown in FIGS. 25 and 26 in order to eliminate the adverse influence of the diffraction or deflection of light at the small reflecting surfaces. However, the optical system shown in FIGS. 30 and 31 is different from that shown in FIGS. 25 and 26 in the arrangement of the illumination optical system and the imaging optical system with respect to the surface of the light modulation element. In the optical system shown in FIG. 30, the imaging optical system is arranged such that the optical axis of each lens element of an imaging lens array 94 is perpendicular to the element surface (x-y plane) of a light modulation element 90. Therefore, the pupil of each lens element of the imaging lens array 94 is parallel to the surface of the element 90. The present invention is similarly applicable to a case wherein small reflecting surfaces of the light modulation element 90 are arranged in a two-dimensional matrix. Assume that the small reflecting surfaces 72 or 42 shown in FIG. 11 or FIG. 6 are arranged in more than one array along the y-axis in a matrix form. In the light modulation apparatus shown in FIG. 26, since the optical axis of the imaging optical system 94 is not perpendicular to the surface of the light modulation element 90, if the region for arranging the small reflecting surfaces along the y-axis is too wide, the region may deviate from the focal depth of the imaging optical system 94. However, in the embodiments shown in FIGS. 30 and 31, since the optical axis of the imaging optical system 94 is perpendicular to the surface (x-y plane) of the light modulation element 90, the element surface and a light-receiving surface 95 can be kept at a conjugate position with respect to the imaging optical system 94. Therefore, even if the elements are arranged in a matrix wherein small reflecting surfaces are wide along the y-axis, a good imaging effect can be obtained.

In order to operate the small reflecting surfaces, an electric field can be applied as in the conventional apparatuses. In addition, a magnetic material can be coated as a light-reflecting film as a light reflecting surface 20, and the small reflecting surfaces can be driven by a magnetic field.

In the light modulation apparatus according to the present invention, as in the case of the apparatuses shown in FIGS. 20 to 24, the following advantages are obtained:

(1) Diffracted light as noise light can be easily eliminated, and modulated light can be effectively utilized.

(2) The arrangement of the optical system is simple.

(3) The optical system can be rendered compact in size.

A light modulation apparatus for a scanning optical system according to still another embodiment of the present invention will now be described.

Figure 32:
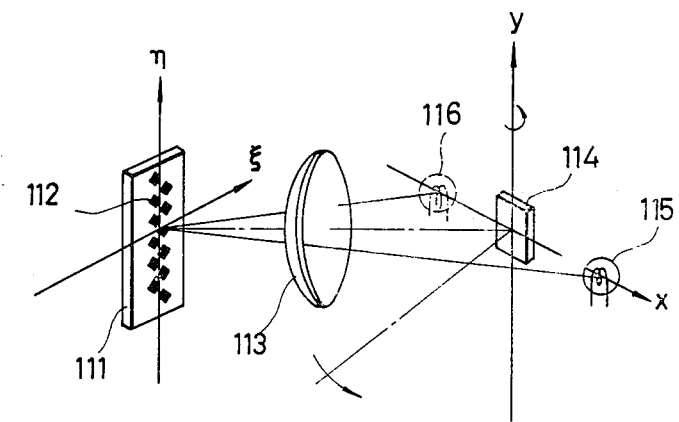
FIGS. 32 and 33 are diagrams showing a light modulation apparatus (scanning optical system) according to still another embodiment of the present invention.
Figure 33:
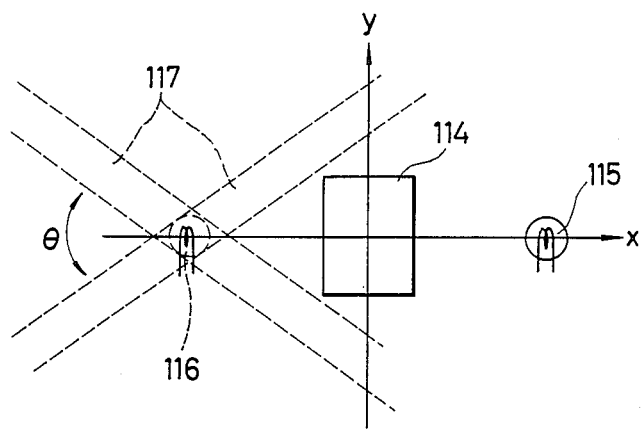

FIG. 32 shows a light modulation apparatus according to still another embodiment of the present invention and constituting a scanning optical system. A light modulation element 111 has a plurality of small reflecting surfaces 112 as shown in FIG. 2. A lens 113 is interposed between the element 111 and a light deflector 114 (e.g., a vibrating mirror or rotating mirror). The small reflecting surfaces 112 of the light modulation element 111 are illuminated with light from a light source (e.g., a semiconductor laser, a light-emitting diode or a halogen lamp) 115, and form by regular reflection (non-modulation) a conjugate image 116 of the light source. The optical system is arranged such that the conjugate image 116 of the light source is formed at a position other than the effective deflecting portion of the deflector 114, i.e., the portion of the deflector 114 used for scanning, and the diffracted light generated by the shape of the small reflecting surfaces 112 of the light modulation element 111 is also guided to a position outside the effective deflecting portion of the deflector 114. FIG. 33 is a diagram showing the arrangement of FIG. 32 when viewed in a direction perpendicular to the x-y plane. The arrangement shown in FIG. 32 will be described in more detail.

The deflector 114 is pivotal about the y-axis. The light modulation element 111 has arrays of small reflecting surfaces 112 which are parallel to the y-axis. The focal point of the lens system 113 is aligned between the deflector 114 and the small reflecting surfaces 112. The light source 115 is preferably arranged in a plane which includes the optical axis of the lens system 113 and is perpendicular to the axis η (array direction of the small reflecting surfaces 112), or near such a plane. With this arrangement, the center of the deflector 114 can be arranged in a direction along which the diffraction light distribution becomes minimum, and the amount of incident diffracted light which may be noise light within the effective deflecting portion of the deflector 114 can be reduced. The deflection direction of the small reflecting surfaces 112 is parallel to the direction ξ perpendicular to the array direction η of the small reflecting surfaces 112, in the arrangement shown in FIG. 32. In the arrangement shown in FIG. 32, the direction ξ of small reflecting surfaces is parallel to the pivot y-axis of the deflector 114. However, the present invention is not limited to this.

Figure 34:
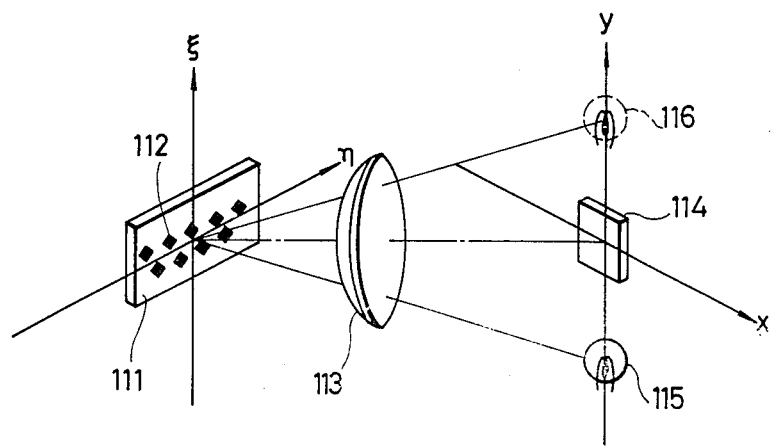
FIGS. 34 and 35 are diagrams showing a light modulation apparatus according to still another embodiment of the present invention.
Figure 35:
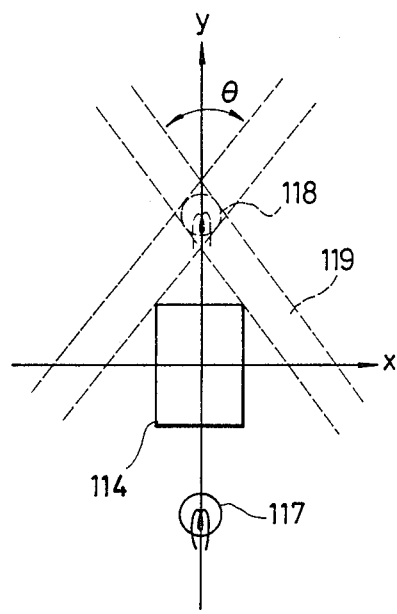

FIG. 34 shows a case wherein the array direction of the small reflecting surfaces 112 is not parallel to the pivotal y-axis of the deflector 114, and the axis perpendicular to the array direction η is parallel to the pivotal y-axis of the deflector 114. In this case, when the light source 115 is arranged in a plane which includes the optical axis of the lens system 113 and parallel to the y-axis, the amount of diffracted light incident on the effective deflecting portion of the deflector 114 can be reduced. This state is shown in FIG. 35. In this case, the deflection direction of the light by the small reflecting surfaces 112 is parallel to the pivot y-axis. In this manner, the small reflecting surfaces 112 can be arranged in any direction with respect to the pivot y-axis of the deflector 114. However, by using a light modulation element using the small reflecting surfaces 112 of the shape as shown in FIG. 11, the relationship between the shape of the small reflecting surfaces and the position of the light source can be set as described above. The reason for this is as follows.

The small reflecting surfaces in FIG. 11 are designed such that the array direction η(x) is perpendicular to the deflection direction, and a maximum value of diffracted light is not generated in a direction parallel to the deflecting direction. In contrast to this, in the light modulation element shown in FIG. 24, the deflecting direction of the small reflecting surfaces 112 is parallel to the array direction η(x) of the light modulation element. As in the case shown in FIG. 11, light is not deflected in a direction along which a maximum value of diffracted light distribution is generated by the shape of the small reflecting surfaces 112. When the arrangement relationship between the light modulation element and deflector as shown in FIG. 24 is set to be the same as that shown in FIG. 32 or FIG. 34, the light source can be arranged in a plane including the array direction of the small reflecting surfaces and the optical axis of the lens system, or near such a plane. The shape of the small reflecting surfaces as shown in FIG. 11 or FIG. 24 need not be square. However, as shown in FIG. 33 or 35, the shape of the small reflecting surfaces preferably allows arrangement of a deflector near a point at which the diffraction light distribution is minimum. If the small reflecting surfaces are square, the vertex angle ρ shown in FIG. 11 is associated with the scattering angle θ of the diffracted light distribution as shown in FIG. 35. The vertex angle ρ of the small reflecting surfaces is determined in accordance with the distance between the deflector and the light source image, the size of the effective deflecting portion of the deflector and the like.

Figure 36:
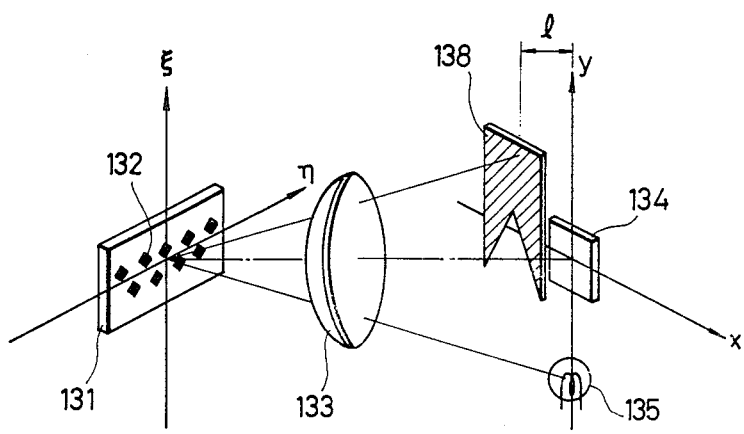
FIGS. 36 and 37 are diagrams showing a light modulation apparatus according to still another embodiment of the present invention.

FIG. 36 shows still another embodiment of the present invention wherein noise light is removed when the distance between a deflector mirror 134 and a light source image cannot be made sufficient. The arrangement of a light modulation element 131 and the deflector 134 is the same as that shown in FIG. 34. A light source image and a shielding plate 138 for shielding the diffracted light are interposed between a lens system 133 and the deflector 134. This allows further elimination of noise light. This embodiment is effective when only a small distance can be allowed between the light source image and the deflector. Although not shown in the drawing, the effective deflection portion of the deflector can have a shape not to deflect noise light so as to provide the same effect.

Figure 37:
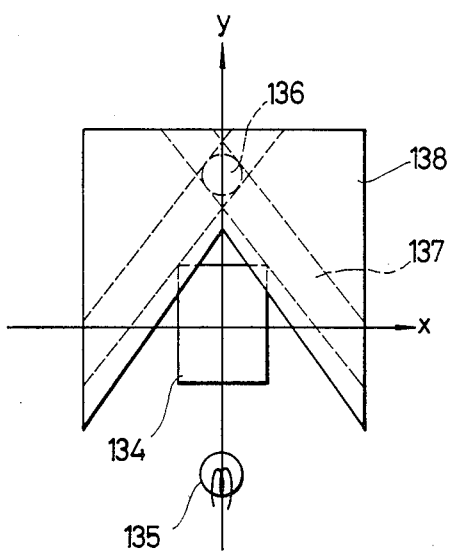

FIG. 37 shows the arrangement of the light-shielding plate 138, the deflector 134, a light source 135, the light source image 136 and the diffracted light 137 as viewed from the optical axis of the lens system 133 as shown in FIG. 36.

Figure 38:
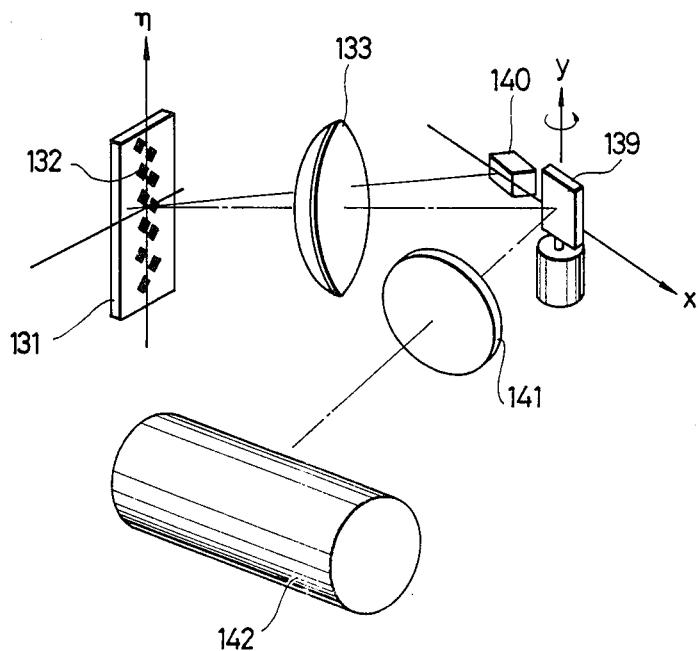
FIGS. 38 and 39 are diagrams showing optical printers using light modulation apparatuses according to still other embodiments of the present invention.

FIG. 38 shows still another embodiment of the present invention wherein a light modulation apparatus is used in an optical printer. A light modulation element 131 and small reflecting surfaces 132 are similar to those as shown in FIGS. 11 or 24. A galvano mirror scanner 139 serves as an optical deflector. A semiconductor laser 140 is arranged such that the light source image and diffracted light do not become incident on the deflecting surface of the galvano mirror scanner 139 through a lens system 133. When a signal is supplied to the light modulation element 131 and the respective small reflecting surfaces 132 time-serially or simultaneously deflect incident light, the modulated light is scanned on an electrophotographic photosensitive body 142 through a scanning lens system 141 by the galvano mirror scanner 139. In this manner, a plurality of scanning lines are obtained upon a single scanning of the galvano mirror scanner, and high-speed printing can be achieved. In an optical printer shown in FIG. 39, in the scanning optical system used in the optical printer shown in FIG. 38, in order to effectively illuminate the arrangement of the small reflecting surfaces 132 of the light modulation element 131, a cylindrical lens 143 is interposed between the lens system 133 and the light modulation element 131.

Figure 39:
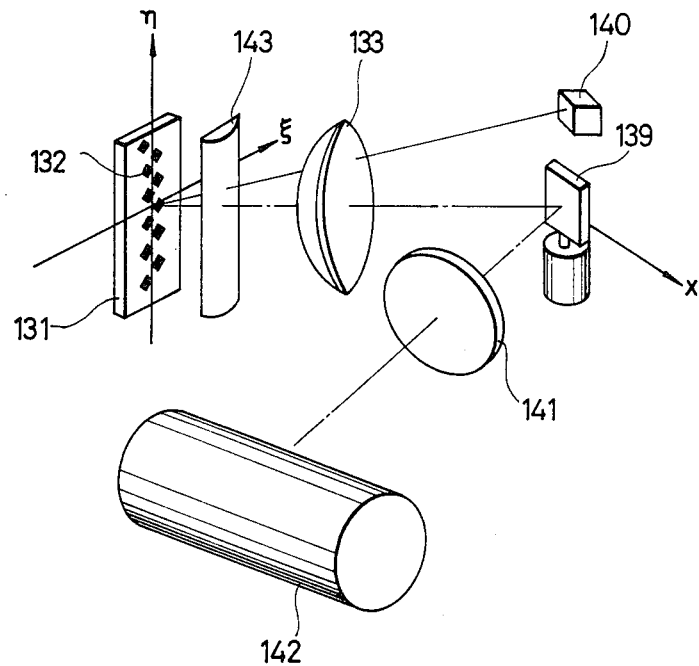

In the embodiment shown in FIG. 39, the light modulation element 131 is the same as that shown in FIG. 24 and is arranged on a line extending from the pivotal axis of the deflector or at a position close thereto. Light emitted by a semiconductor laser is almost collimated by the lens system 133. Light is focused by the cylindrical lens 143 in a direction which is perpendicular to the array direction η of the small reflecting surfaces 132 of the light modulation element 131. Linear illumination along the array of small reflecting surfaces is achieved.

In the previous embodiments, the array of the small deflecting portions is one-dimensional. However, a similar effect can be obtained if a matrix arrangement is adopted.

As can be seen from FIG. 11 or FIG. 24, when the deflection direction of a second deflector corresponds to a direction perpendicular to the array direction of small reflecting surfaces, the density distribution between scanning lines can be rendered uniform. This can be achieved by suitably selecting the size and the array pitch of the small reflecting surfaces and cannot be achieved in conventional apparatuses.

If the diffracted light is not incident on the deflector in accordance with the particular shape and array of small reflecting surfaces, diffracted light will not become incident on the deflector and noise light is not accumulated on the scanning surface, so that an image of high contrast can be obtained.

When the shape of small reflecting surfaces is as shown in FIG. 11 or 24, a desired image density can be obtained between scanning lines.

The optical system can be simplified by adopting a light modulation element as described above.

As described above, the present invention provides many and effective advantages which are not obtainable with conventional apparatuses.

We claim:

1. A light modulation apparatus comprising:
a light modulation element having a plurality of light modulating portions, said element respectively controlling said light modulating portions in accordance with input signals to selectively direct light incident on said element in first and second directions, said light modulating portions being arranged in a predetermined direction, and a light receiving surface provided on each of said light modulating portions having a plurality of edges extending in a slanted manner with respect to said predetermined direction;
means for irradiating said light modulation element with the incident light; and
optical means for receiving a light directed in one of said first and said second directions by said light modulating portions to direct said directed light toward a predetermined direction, a pupil of said optical means lying outside an emergence-direction of a main portion of diffracted light generated in accordance with the shape of said light receiving surface of each of said light modulating portions when said incident light is directed in the other of said first and second directions.

2. An apparatus according to claim 1, wherein said light receiving surface of each of said light modulating portions consist of a reflecting surface having a polygonal shape.

3. An apparatus according to claim 1, wherein said optical means includes an imaging optical system for imaging the light modulated by each of said light modulating portions onto a predetermined image plane.

4. An apparatus according to claim 3, wherein said imaging optical system consists of a compound eye optical system having a plurality of lens elements.

5. An apparatus according to claim 1, wherein said optical means includes scanning means for deflecting the light directed by said light modulating portions to perform scanning.

6. An apparatus according to claim 1, further comprising a lens system in a light path between said light modulating portions and said scanning means, and wherein the light receiving surface of each of said light modulating portions and a light receiving surface of said scanning means are respectively disposed at focal planes of said lens system.

7. An apparatus according to claim 1, wherein said optical means includes an optical member for increasing a separation angle between light directed toward said first and second directions by each of said light modulating portions in accordance with the input signal.

8. An apparatus according to claim 7, wherein said optical member consists of a concave cylindrical lens.

9. An apparatus according to claim 7, wherein said optical member consists of a volume hologram.

10. An apparatus according to claim 11, wherein said light modulating portions are arranged in a staggered manner and the most adjacent slanted edges of the most adjacent two light receiving surfaces are parallel to each other.

11. A light modulation apparatus comprising:
a light modulation element for modulating light incident thereon in accordance with an input signal to selectively direct the incident light toward at least two different directions;
means for irradiating said light modulation element with the incident light; and
an optical member for increasing a separation angle between the light directed toward the different directions by said element, said optical member being disposed at a light emergence side of said light modulation element.

12. An apparatus according to claim 11, wherein said optical member consists of a concave cylindrical lens.

13. An apparatus according to claim 11, wherein said optical member consists of a volume hologram.

14. An apparatus according to claim 11, wherein said light modulation element includes a substrate and a plurality of movable reflecting surfaces arranged in a predetermined direction on said substrate, each of said reflecting surfaces being moved in accordance with the input signal to selectively reflect the incident light toward first and second directions, the incident light from said irradiating means reaches said light modulation element through said optical member and said optical member increases the separation angle between the light reflected towards said first and second directions.

15. An apparatus according to claim 14, wherein said optical member consists of a concave cylindrical lens and a generatrix of said cylindrical lens extends parallel to said predetermined direction.

16. An apparatus according to claim 14, wherein said optical member consists of a volume hologram.

17. A light modulation apparatus comprising:
a substrate; and
a plurality of light modulating portions disposed on said substrate in a predetermined direction for modulating incident light in accordance with an input signal, said light modulating portions being arranged in said predetermined direction and in a staggered manner on said substrate, a light receiving surface provided on each of said light modulating portions having a plurality of edges extending in directions slanted with respect to said predetermined direction, and the most adjacent slanted edges of the most adjacent two light receiving surfaces being parallel with each other.

18. An element according to claim 17, wherein said light receiving surface is a light reflecting surface and said light reflecting surface is movable in accordance with an input signal to selectively reflect the incident light in first and second directions.

19. An element according to claim 18, wherein the directions in which said slanted edges are non-perpendicular to a plane defined by said first and second directions.

20. A light modulation element comprising:
a substrate; and
a plurality of light reflecting surfaces arranged in a predetermined direction on said substrate, each of said reflecting surfaces being movable in accordance with an input signal to selectively reflect an incident light toward first and second directions, each of said reflecting surfaces being of a shape having a plurality of edges extending in directions which are slanted with respect to a direction in which said reflecting surfaces are arranged, and said directions in which said edges extend being non-perpendicular to a plane defined by said first and second directions.

21. An element according to claim 20, wherein said reflecting surface is movable about a fulcrum which lies on a plane defined by said first and second directions.

22. A light modulation apparatus comprising:
a light modulation element having at least one light deflecting portion, said light deflecting portion having a reflecting surface having a plurality of edges, and selectively reflecting light incident thereon toward first and second directions by moving said reflecting surface;
means for irradiating said light modulation element with the incident light; and
an optical system for receiving a light reflected in one of said first and second directions reflected by said element to direct said reflected light toward a predetermined direction, a pupil of said optical system lying outside an emergence direction of a main portion of diffracted light generated in accordance with the shape of said reflecting surface when the incident light is deflected toward the other of said first and second directions, wherein said pupil is so disposed that the diffracted light does not enter said pupil so as to effectively remove the diffracted light.

23. An apparatus according to claim 22, wherein said element includes a substrate and a plurality of said reflecting surfaces arranged in a predetermined direction on said substrate, and each of said reflecting surfaces has a plurality of edges extending in a slanted manner with respect to said predetermined direction in which said reflecting surfaces are arranged.

24. An apparatus according to claim 23, wherein said reflecting surfaces are arranged in a staggered manner and the most adjacent slanted edges of the most adjacent two reflecting surfaces are parallel to each other.

25. An apparatus according to claim 23, wherein said optical system images the light reflected in said one of said first and second directions onto a predetermined image surface, and the optical axis of said optical system is perpendicular to a surface on which said reflecting surfaces are arranged.

26. An apparatus according to claim 23, wherein the directions in which said slanted edges extend are non-perpendicular to a plane defined by said first and second directions.

27. An apparatus according to claim 23, wherein said optical system includes a compound-eye optical system, and the pitch Pl of lens elements of said compound-eye optical system and the pitch $P_s$ of said arranged reflecting surfaces satisfy a selected one of:

$Pl:P_s = 1:m$ and $Pl:P_s = n:1$, where m and n are integers and where m, $n \geq 1$.

28. An apparatus according to claim 22, wherein said optical system includes light deflecting means and deflecting means scans the light reflected in said one of said first and second directions along said predetermined direction.

29. A light modulation apparatus comprising:
a light modulation element, said element modulating light incident thereon in accordance with an input signal to selectively provide a modulated light and a non-modulated light;
means for directing the incident light to said element; and
optical means disposed in light paths of said modulated and non-modulated lights for increasing a separation angle between said modulated and non-modulated lights.

* * * * *

UNITED STATES PATENT AND TRADEMARK OFFICE
CERTIFICATE OF CORRECTION

PATENT NO. : 4,842,396
DATED : June 27, 1989
INVENTOR(S) : KAZUO MINOURA, ET AL.

Page 1 of 4

It is certified that error appears in the above-identified patent and that said Letters Patent is hereby corrected as shown below:

IN [57] ABSTRACT

Line 9, "modulation" should read --modulated--.

COLUMN 1

Line 39, "example." should read --element.--.

COLUMN 2

Line 64, "changes" should read --charges--.

COLUMN 4

Line 16, "portions are" should read --portions have polygonal shapes, and the modulation portions are--.

COLUMN 7

Line 23, "centers of gravity 42 and 54 o" should read --centers of gravity 52 and 54 on--.
    Line 24, "Since 61 and 62," should read --Sides 61 and 62,--.

COLUMN 10

Line 16, "cantiliver" should read --cantilever--.
    Line 24, "FIG. 1" should read --FIG. 12--.

UNITED STATES PATENT AND TRADEMARK OFFICE
CERTIFICATE OF CORRECTION

PATENT NO. : 4,842,396

DATED : June 27, 1989

INVENTOR(S) : KAZUO MINOURA, ET AL.

It is certified that error appears in the above-identified patent and that said Letters Patent is hereby corrected as shown below:

COLUMN 11

Line 29, "abberation" should read --aberration--.
Line 57, "against" should read --along--.

COLUMN 12

Line 3, "angle - $\theta$" should read --angle - $\phi$--.

COLUMN 13

Line 23, "upper right wide" should read
--upper right side--.
Line 29, "one-dimensinal" should read
--one-dimensional--.
Line 58, "is" should read --is perpendicular to the
sheet of drawing. Therefore, light modulated
by the small reflecting surfaces is--.

COLUMN 17

Line 5, "each" should read --each lens element
constituting the lens array 94 is within the
plane parallel to the y-z plane. The optical
axis of each--.
Line 33, "element" should read --elements--.
Line 48, "parallelpiped region 109" should read
--parallelepiped region 109--.

UNITED STATES PATENT AND TRADEMARK OFFICE
CERTIFICATE OF CORRECTION

PATENT NO. : 4,842,396
DATED : June 27, 1989
INVENTOR(S) : KAZUO MINOURA, ET AL.

It is certified that error appears in the above-identified patent and that said Letters Patent is hereby corrected as shown below:

COLUMN 18

Line 7, "FIG. 17," should read --FIG. 27,--.
Line 17, "parallelpiped" should read --parallelepiped--.
Line 27, "parallelpiped" should read --parallelepiped--.

COLUMN 19

Line 26, "FIG. 2." should read --FIG. 32.--.

COLUMN 20

Line 23, "deflection" should read --deflecting--.

COLUMN 22

Line 12, "said" (second occurrence) should be deleted.
Line 15, "emergence-direction" should read
--emergence direction--.
Line 23, "consist" should read --consists--.
Line 36, "claim 1," should read --claim 5,--.
Line 52, "claim 11," should read --claim 1,--.

UNITED STATES PATENT AND TRADEMARK OFFICE
CERTIFICATE OF CORRECTION

PATENT NO. : 4,842,396

DATED : June 27, 1989

INVENTOR(S) : KAZUO MINOURA, ET AL.

It is certified that error appears in the above-identified patent and that said Letters Patent is hereby corrected as shown below:

COLUMN 23

Line 42, "edges are" should read --edges extend are--.

Signed and Sealed this

Thirty-first Day of December, 1991

Attest:

HARRY F. MANBECK, JR.

*Attesting Officer*   Commissioner of Patents and Trademarks